US008659764B2

(12) United States Patent
Hatzilias et al.

(10) Patent No.: US 8,659,764 B2
(45) Date of Patent: Feb. 25, 2014

(54) ESTIMATING PHYSICAL PARAMETERS USING THREE DIMENSIONAL REPRESENTATIONS

(75) Inventors: Karol Hatzilias, Atlanta, GA (US); Giorgos Hatzilias, Buford, GA (US); James Alan Burns Emsley, Franklin, KY (US); Harris Bergman, Marietta, GA (US); Chris Van Buren, Snellville, GA (US); John Durbin, Roswell, GA (US); Nate Berglund, Norcross, GA (US)

(73) Assignee: Body Surface Translations, Inc., Athens, GA (US)

( * ) Notice: Subject to any disclaimer, the term of this patent is extended or adjusted under 35 U.S.C. 154(b) by 722 days.

(21) Appl. No.: 12/699,629

(22) Filed: Feb. 3, 2010

(65) Prior Publication Data
US 2010/0222684 A1 Sep. 2, 2010

Related U.S. Application Data

(60) Provisional application No. 61/156,205, filed on Feb. 27, 2009.

(51) Int. Cl.
*G01B 11/24* (2006.01)
(52) U.S. Cl.
USPC .......................................................... 356/601
(58) Field of Classification Search
USPC .......................................................... 356/601
See application file for complete search history.

(56) References Cited

U.S. PATENT DOCUMENTS

| 4,745,472 | A | * | 5/1988 | Hayes ............................ 348/141 |
| 5,412,420 | A | * | 5/1995 | Ellis .............................. 348/135 |
| 5,483,441 | A | * | 1/1996 | Scofield .......................... 700/90 |
| 5,509,090 | A | | 4/1996 | Maruyama et al. |
| 5,576,949 | A | | 11/1996 | Scofield et al. |
| 5,666,903 | A | | 9/1997 | Bull et al. |
| 5,875,257 | A | | 2/1999 | Marrin et al. |
| 6,198,834 | B1 | | 3/2001 | Belk et al. |
| 6,229,913 | B1 | | 5/2001 | Nayar et al. |
| 6,239,711 | B1 | | 5/2001 | Downey et al. |
| 6,314,654 | B1 | | 11/2001 | Morissette |
| 6,323,942 | B1 | | 11/2001 | Bamji |
| 6,377,353 | B1 | | 4/2002 | Ellis |

(Continued)

FOREIGN PATENT DOCUMENTS

| CN | 1936496 | 3/2007 |
| CN | 101061367 | 10/2007 |

(Continued)

OTHER PUBLICATIONS

Alberta Pork Industry Report. vol. 2, Issue 2, Apr. 2005.

(Continued)

*Primary Examiner* — Roy M Punnoose
(74) *Attorney, Agent, or Firm* — Meunier Carlin & Curfman, LLC

(57) ABSTRACT

Methods, systems, and apparatus for estimating physical parameters using three dimensional representations. In one aspect, predetermined light patterns are projected onto an object and light patterns resulting from an interaction of the projected light patterns and portions of the object are detected. Three dimensional locations of multiple light elements in the detected light pattern are determined, and physical parameters of the object, for example, weight, are estimated based on the locations.

23 Claims, 17 Drawing Sheets

(56) References Cited

U.S. PATENT DOCUMENTS

| | | | |
|---|---|---|---|
| 6,549,288 B1 | 4/2003 | Migdal et al. | |
| 6,549,289 B1 | 4/2003 | Ellis | |
| 6,678,396 B2 | 1/2004 | Bartle | |
| 6,805,078 B2 | 10/2004 | Zimmerman et al. | |
| 6,820,033 B1 * | 11/2004 | Hapgood et al. | 702/173 |
| 6,974,373 B2 * | 12/2005 | Kriesel | 452/157 |
| 7,004,904 B2 | 2/2006 | Chalana et al. | |
| 7,039,220 B2 * | 5/2006 | Kriesel | 382/110 |
| 7,128,024 B2 | 10/2006 | Doyle, II | |
| 7,129,423 B2 | 10/2006 | Baarsch et al. | |
| 7,214,128 B2 * | 5/2007 | Kriesel | 452/157 |
| 7,257,237 B1 | 8/2007 | Luck et al. | |
| 7,310,431 B2 | 12/2007 | Gokturk et al. | |
| 7,399,220 B2 * | 7/2008 | Kriesel et al. | 452/157 |
| 7,406,927 B2 | 8/2008 | Baarsch et al. | |
| 7,519,200 B2 | 4/2009 | Gokturk et al. | |
| 7,542,610 B2 | 6/2009 | Gokturk et al. | |
| 7,603,284 B2 | 10/2009 | Stroman et al. | |
| 7,650,020 B2 | 1/2010 | Monro | |
| 7,657,100 B2 | 2/2010 | Gokturk et al. | |
| 7,657,126 B2 | 2/2010 | Gokturk et al. | |
| 7,672,505 B2 * | 3/2010 | Sasaki | 382/154 |
| 7,689,019 B2 | 3/2010 | Boese et al. | |
| 7,711,156 B2 | 5/2010 | Kim et al. | |
| 7,764,838 B2 | 7/2010 | Jolly et al. | |
| 7,782,470 B2 | 8/2010 | Domenicali et al. | |
| 7,804,586 B2 | 9/2010 | Rodrigues et al. | |
| 7,853,046 B2 | 12/2010 | Sharony | |
| 7,924,160 B1 | 4/2011 | LaPenta et al. | |
| 8,028,657 B2 | 10/2011 | Pratt | |
| 8,036,429 B2 | 10/2011 | Doyle et al. | |
| 8,115,816 B2 | 2/2012 | Ogawa | |
| 8,261,694 B2 | 9/2012 | Pratt | |
| 8,294,958 B2 * | 10/2012 | Paterson et al. | 358/474 |
| 8,314,794 B2 | 11/2012 | Paulsen | |
| 8,355,885 B2 | 1/2013 | Krien | |
| 2004/0008259 A1 * | 1/2004 | Gokturk et al. | 348/207.1 |
| 2004/0023612 A1 | 2/2004 | Kriesel | |
| 2004/0032974 A1 | 2/2004 | Kriesel | |
| 2005/0136819 A1 * | 6/2005 | Kriesel | 452/157 |
| 2005/0257748 A1 * | 11/2005 | Kriesel et al. | 119/51.02 |
| 2006/0262970 A1 | 11/2006 | Boese et al. | |
| 2007/0022967 A1 | 2/2007 | Doyle | |
| 2007/0031029 A1 * | 2/2007 | Sasaki | 382/154 |
| 2008/0063885 A1 | 3/2008 | Krien | |
| 2008/0187183 A1 | 8/2008 | Monro | |
| 2008/0200818 A1 | 8/2008 | Determan et al. | |
| 2008/0204697 A1 | 8/2008 | Domenicali et al. | |
| 2008/0237505 A1 | 10/2008 | Rodrigues et al. | |
| 2008/0273760 A1 | 11/2008 | Metcalfe et al. | |
| 2008/0289883 A1 | 11/2008 | Baarsch et al. | |
| 2009/0112089 A1 * | 4/2009 | Barnard et al. | 600/443 |
| 2009/0225173 A1 | 9/2009 | Ogawa | |
| 2009/0234200 A1 | 9/2009 | Husheer | |
| 2010/0030036 A1 | 2/2010 | Mottram et al. | |
| 2010/0111370 A1 | 5/2010 | Black et al. | |
| 2010/0121618 A1 | 5/2010 | Greenwood | |
| 2010/0207036 A1 | 8/2010 | Massonneau et al. | |
| 2010/0224140 A1 | 9/2010 | Bareket et al. | |
| 2010/0246970 A1 | 9/2010 | Springer et al. | |
| 2010/0289879 A1 | 11/2010 | Sinzinger et al. | |
| 2011/0028212 A1 | 2/2011 | Krien | |
| 2012/0158463 A1 | 6/2012 | Pratt | |
| 2013/0103345 A1 | 4/2013 | Krien | |

FOREIGN PATENT DOCUMENTS

| | | |
|---|---|---|
| DE | 102006049695 | 4/2008 |
| EP | 0660079 | 6/1991 |
| EP | 768026 | 4/1997 |
| EP | 2124196 | 11/2009 |
| JP | 2613527 | 5/1997 |
| JP | 10500207 | 1/1998 |
| JP | 2000171924 | 6/2000 |
| JP | 2000283739 | 10/2000 |
| JP | 2002286421 | 10/2002 |
| JP | 2008172906 | 7/2008 |
| WO | 94/12020 | 6/1994 |
| WO | WO9528807 | 10/1995 |
| WO | 00/11936 | 3/2000 |
| WO | 2004/012146 | 2/2004 |
| WO | 2005/009118 | 2/2005 |
| WO | 2005/076196 | 8/2005 |
| WO | 2005/076214 | 8/2005 |
| WO | 2006/122164 | 11/2006 |
| WO | 2007/119070 | 10/2007 |
| WO | 2008/035151 | 3/2008 |
| WO | 2008/134886 | 11/2008 |
| WO | 2008/147888 | 12/2008 |
| WO | 2010/019925 | 2/2010 |
| WO | 2010/063527 | 6/2010 |
| WO | 2010/098954 | 9/2010 |
| WO | 2010/127023 | 11/2010 |
| WO | 2010/127277 | 11/2010 |
| WO | 2011/143711 | 11/2011 |

OTHER PUBLICATIONS

Bancroft, John. "Hitting the Target on Your Grid" London Swine Conference—Thinking Globally, Acting Locally. pp. 95-97, Apr. 5-6, 2006.

Brink, Willie et al. "Indexing Uncoded Stripe Patterns in Structured Light Systems by Maximum Spanning Trees," The British Machine Vision Conference, University of Leeds, Leeds, UK. Sep. 1-4, 2008.

Bullock, K.D. et al. "Comparison of real-time ultrasound and other live measures to carcass measures as predictors of beef cow energy stores" J Anim Sci 69:3908-3916. pp. 3908-3916, 1991.

Centred on Swine. The Newsletter of Prairie Swine Centre Inc. pp. 1-8. Volume 12, No. 1, Spring 2005.

Colebrook, Martyn. "Welcome to qscan. An Introduction to Visual Imaging Analysis" qscan, Innovent Technology. Apr. 2008.

"CVS Whole Carcass Camera Capabilities" printed on Nov. 5, 2008.

De La Hamette, Patrick et al. "Laser Triangulation as a means of robust Visual Input for Wearable Computers" International Sympsium on Wearable Computers. Published at ISWC'04, Oct. 2004.

De Lange, C.F.M. et al. "Feed Intake & Growth Curves in Growing—Finishing Pigs" Prairie Swine Center Inc. Annual Search Report. pp. 22-26, 1993.

De Pape, J.G. et al. "Live Hog Probes at Various Sites, Weights, and Ages as Indicators of Carcass Merit" J Anim Sci 15:1029-1035, 1956.

DiPietre, Dennis. "The Profit Potential of Intentional Production" Pork Business Journal. pp. 10-15, Aug. 2009.

Doeschl-Wilson, A.B. et al. "The relationship between body dimensions of living pigs and their carcass composition" Meat Science. 70: 229-240, 2005.

Doeschl-Wilson, A.B. et al. "Using visual image analysis to describe pig growth in terms of size and shape" Animal Science. 79:415-427, 2004.

Fisher, A.V. et al. "Growth of carcass components and its relation with conformation in pigs of three types" Meat Science. 65:639-650, 2003.

Fitzhugh Jr., H.A. "Analysis of Growth Curves and Strategies for Altering Their Shape" J Anim Sci. 42:1036-1051, 1976.

Fortin, A. et al. "A novel approach to grading pork carcasses: computer vision and ultrasound" Meat Science. 63:451-462, 2003.

Frey, Barb. "The economics of sale decisions" Allen D. Leman Swine Conference. pp. 138-146, 2007.

Fu, W. et al. "Web-based Method for Inspecting the Pig Body Size and Height Using Binocular Stereovision Technology" Livestock Environment VIII Proceedings of the Aug. 31-Sep. 4, 2008 Conference. Iguassu Falls, Brazil. Pub Date: Aug. 31, 2008.

Gonyou, Harold W. "Constipated Barns: Where Has All of the Space Gone?" Advances in Pork Production. 18:119-122, 2007.

Gonyou, Harold W. et al. "Effects of Floor Area Allowance and Group Size" Prairie Swine Centre Inc. Annual Search Report pp. 52-54, 1997.

(56) References Cited

OTHER PUBLICATIONS

Halas, V. et al. "Modelling of nutrient partitioning in growing pigs to predict their anatomical body composition. 1. Model description" British Journal of Nutrition. 92:707-723, 2004.
Halas, V. et al. "Modelling of nutrient partitioning in growing pigs to predict their anatomical body composition. 2. Model evaluation" British Journal of Nutrition. 92:725-734, 2004.
Harding, Kevin. "3D Machine Vision as a Shop Floor Metrology Tool" General Electric Research Center. 2002.
Heiser, M.D. "A Study of the Cut-out Values of Hogs" J Anim Sci. pp. 148-151. 1930.
Hetzer, H.O. et al. "Relationships Between Certain Body Measurements and Carcass Characteristics in Swine" J Anim Sci. 9:37-47, 1950.
Hicks, C. et al. "Influence of Systematic Biases Associated with Genotype and Sex on Prediction of Lean Mass and Carcass Value in U.S. Pigs" Purdue University. Swine Day. pp. 92-96, Aug. 28, 1997.
"How to Use Tape to Weigh a Horse" Source: Wikihow. http://www.wikihow.com/Use-a-Tape-to-Weigh-a-Horse. Source Nov. 29, 2007.
International Search Report and Written Opinion mailed Sep. 30,2010, in related International Application No. PCT/US2010/023060, 10 pages.
Iwasawa, T. et al. "Comparison of Hearth Girth or Flank-To-Flank Measurements for Predicting Sow Weight" Swine Day pp. 17-21, 2004.
Korthals, R. L. "Monitoring Growth and Statistical Variation of Grow-Finish Swine" Livestock Environment VI: Proceedings of the 6th International Symposium. Louisville, KY. ASAE St Joseph, USA. S.64-71, 2001.
Marchant, J.A. et al. "Extending the snake image processing algorithm for outlining pigs in scenes" Computers and Electronics in Agriculture. 8:261-275, 1993.
Margolin, S. et al. "The Influence of Inbreeding upon the Weight and Size of Dairy Cattle" J Anim Sci. 4:3-12, 1945.
McFarlane, N.J.B. et al. "Shape measurements of live pigs using 3-D image capture" Animal Science. 81:383-391, 2005.
Minagawa, H. "Measurement of Cattle Body Surface Area by Stereo Photography" Proceedings of the third international livestock environmental symposium. Toronto, Ontario, Canada. pp. 179-185, Apr. 25-27, 1988.
Minagawa, Hideo. "Stereo Photogrammetric Errors in Determining the Surface Area of a Small Pig Model with Non-metric Cameras" J Agric Meteorol 51(4):335-343, 1995.
Minagawa, H. et al. "A Hands-Off Method to Estimate Pig Weight by Light Projection and Image Anaylsis" Livestock Environment VI: Proceedings of the 6th International Symposium. Louisville, KY. pp. 72-79, May 21-23, 2001.
Minagawa, Hideo. "Surface Area, Volume, and Projected Area of Japanese-Shorthorn Cattle Measured by Stereo Photogrammetry Using Non-metric Cameras" J Agr Meteorol 50(1):17-22, 1994.
Munday, Helen S. et al. "The Repeatability of Body Composition Measurements in Dogs and Cats using Dual Energy X-Ray Absorptiometry" J Nutr. 124:2619S-2621S, 1994.
Murillo, Mary Cris Karen M. et al. "Body Weight Estimation in Triple Cross Pigs (Large White-Landrace-Duroc) Using External Body Measurements" J Vet Med. 41(1):32-39, 2004.
Parsons, D.J. et al. "Real-time Control of Pig Growth through an Integrated Management System" Biosystems Engineering. 96(2):257-266, 2007.
Person, R.C. et al. "Benchmarking value in the pork supply chain: Processing characteristics and consumer evaluations of pork bellies of different thicknesses when maufactured into bacon" Meat Science. 70:121-131, 2005.
Person, R.C. et al. "Benchmarking value in the pork supply chain: Processing and consumer characteristics of hams manufactured from different quality raw materials" Meat Science. 70:91-97, 2005.
Pfeifer, Craig. "Making scale barns work" Allen D. Leman Swine Conference. pp. 132, 2007.
Range 7 Non-Contact 3D Digitizer. The Visionary Eye. Creating the Future Style of Manufacturing. Konica Minolta Sensing, Inc. Copyright 2008.
Riley, D.G. et al. "Genetic parameters for body weight, hip height, and the ratio of weight to hip height from random regression analyses of Brahman feedlot cattle" J Anim Sci. 85:45-52, 2007.
Rius-Vilarrasa, E. et al. "Evaluation of Video Image Analysis (VIA) technology to predict meat yield of sheep carcasses on-line under UK abattoir conditions" Meat Science. 82:94-100, 2009.
Rodrigues, Marcos A. et al. "Fast 3D reconstruction and recognition" Recent Advances in Computer Engineering. Proceedings of the 8th conference on Signal processing, computational geometry and artificial vision. Rhodes, Greece. pp. 15-21, Aug. 20, 2008. (abstract).
Ruff, B.P. et al. "Fish Sizing and Monitoring Using a Stereo Image Analysis System Applied to Fish Farming" Aquacultural Engineering. 14:155-173, 1995.
Salak-Johnson, Janeen L. "Impact of auto-sort systems on pig welfare" Allen D. Leman Swine Conference. pp. 133-136, 2007.
Schofield, C.P. et al. "Monitoring Pig Growth using a Prototype Imaging System" Journal of Agricultural Engineering Research. vol. 72, Issue 3, pp. 205-210, Mar. 1999.
Siemens, A.L. et al. "Comparison of market hog characteristics of pigs selected by feeder pig frame size or current USDA feeder pig grade standards" J Anim Sci. 68:2217-2221, 1990.
Siemens, A.L. et al. "Relationship between Feeder Pig Frame Size and Market Hog Characteristics" J Anim Sci. 65:1167-1172, 1987.
Stetzer, A. J. et al. "Benchmarking Value in the Pork Supply Chain" American Meat Science Association. Final Report. pp. 1-6, 2003.
Strickon, Joshua et al. "Tracking Hands Above Large Interactive Surfaces with a Low-Cost Scanning Laser Rangefinder" ACM CHI Conference. Los Angeles, CA. Apr. 21-23, 1998.
Sullivan, Brian P. "Genetic Sources of Variability in Pig Production" Advances in Pork Production. 18:131-137, 2007.
Van Ryswyck, Leroy. "On-Farm Experience With Swine Liquid Feeding: Grow-Finish Pigs" London Swine Conference-Thinking Globally, Acting Locally. pp. 195-200, Apr. 5-6, 2006.
Wagner, J.R. et al. "Analysis of Body Composition Changes of Swine During Growth and Development" J Anim Sci. 77:1442-1466, 1999.
Wang, Y. et al. "Non-Contact Sensing of Hog Weights by Machine Vision" Applied Engineering in Agriculture. 22 (4):577-582, 2006.
Wang, Yongsheng et al. "Walk-through Weighing of Hogs by Machine Vision and Artificial Neural Network" ASABE Annual International Meeting. Portland, Oregon. pp. 1-16, Jul. 9-12, 2006.
White, R.P.I et al. "Use of visual image analysis for the management of pig growth in size and shape" Proceedings of the British Society of Animal Science. p. 101, 2003 (abstr.).
Whittemore, Colin T. "An Approach to Pig Growth Modeling" J Anim Sci. 63:615-621, 1986.
Whittemore, C.T. et al. "Physical and chemical composition of the carcass of three different types of pigs grown from 25 to 115 kg live weight" Animal Science. 77:235-245, 2003.
Whittemore, Colin. "Production Control Systems for Pigs" London Swine Conference-Building Blocks for the Future. pp. 111-118, Apr. 1-2, 2004.
Wright, L.I. et al. "Benchmarking value in pork supply chain: Characterization of US pork in the retail marketplace" Meat Science. 71: 451-463, 2005.
Wu, Jiahua et al. "Extracting the three-dimensional shape of live pigs using stereo photogrammetry" Computers and Electronics in Agriculture 44:203-222, 2004.
International Preliminary Report on Patentability, dated Aug. 30, 2011, in connection with corresponding International Application No. PCT/US2010/023060.

* cited by examiner

ESTIMATING PHYSICAL PARAMETERS USING THREE DIMENSIONAL REPRESENTATIONS

CROSS-REFERENCE TO RELATED APPLICATIONS

This application claims the benefit of U.S. Provisional Patent Application No. 61/156,205, filed Feb. 27, 2009, which is incorporated herein by reference in its entirety.

FIELD OF THE INVENTION

The present invention relates to methods, devices and systems for estimating a physical parameter of an object. For example, the methods, devices and systems can be used to produce a three dimensional representation of at least a portion of an object, such as a livestock animal. The three dimensional representation can be used to estimate a physical parameter, such as weight, of the livestock animal.

BACKGROUND

Accurate estimation of an object's physical parameters, such as weight, can be important in many commercial fields. In agriculture, for example, the accurate estimation of final carcass weight is important in efficient livestock processing operations. Accurately estimating a livestock animal's weight and/or final carcass weight can result in significant cost savings to the live stock producer, who often are penalized per animal for a group of animals whose carcasses fall outside of a weight range considered optimal by the meat processing plant. Fewer penalties lead to a higher profit margin for the farmer who can deliver accurately weighed animals. Knowing the weight of the live animal is also important for optimally managing feed resources during the growing period. Methods for weighing animals, however, which include positioning each animal on a scale, can be stressful and harmful to the animal and may result in reduced yields.

SUMMARY

This specification describes technologies relating to estimating physical parameters using three dimensional representations. Provided herein are methods, devices and systems for estimating a physical parameter of an object. For example, the methods, devices, and systems can be used to produce a three dimensional representation of at least a portion of an object, such as a livestock animal. The three dimensional representation can be used to estimate a physical parameter, such as weight, of the livestock animal.

In general, one innovative aspect of the subject matter described here can be implemented as a method for estimating a physical parameter of an object. One or more predetermined light patterns are projected onto at least a portion of the object. Each projected light pattern includes multiple light elements. One or more light patterns resulting from an interaction of one or more of the projected light patterns and at least a portion of the object are detected. Each detected light pattern includes multiple light elements and is detected from a single location. A single detected light pattern is processed to provide a three dimensional representation of at least a portion of the object by determining the three dimensional location of multiple light elements of the single detected light pattern. The three dimensional representation of at least a portion of the object is used to estimate the physical parameter of the object.

This, and other aspects, can include one or more of the following features. The single detected light pattern processed to provide the three dimensional representation of at least a portion of the object can be based on a single projection of a predetermined light pattern onto at least a portion of the object. Each single detection location can be offset from the location from which the pattern is projected. The single location from which one or more of the light patterns is detected can differ between one or more detected light patterns. The physical parameter can be weight. The object can be an animal. The animal can be a mammal. The animal can be a livestock animal. The physical parameter can be selected from the group consisting of weight, surface area, girth, length, height, carcass composition, primal cuts proportions, tissue composition, muscling, body mass index, body asymmetry and volume. A physical measurement of the object can be estimated from the three dimensional representation of at least a portion of the object. The object can be a swine and the physical measurement can be selected from the group consisting of crown-rump length, heart girth, front leg circumference below the elbow, elbow to elbow distance, flank to flank distance, front leg length, crease to crease length, hock circumference, rear leg circumference at groin, width at shoulders, ham width, width at ham crease, width at maximum ham protrusion, belly clearance, height at scapula, height above hip, and height at tail insertion. Additional physical measurements can also be estimated from the three dimensional representation of at least a portion of the object. One or more physical measurement can be used to estimate the weight of the swine, or another livestock animal. In the case of swine, optionally, the crown-rump length multiplied by the ham width multiplied by the tail insertion height can be used to estimate the weight of the swine.

Another innovative aspect of the subject matter described here can be implemented as a computer-implemented method for estimating a physical parameter of an object. Multiple predetermined light patterns are projected onto at least a portion of the object. Each pattern is projected onto the object or portion thereof from substantially the same angle. Each projected light pattern comprises a plurality of light elements. One or more light patterns resulting from an interaction of the projected light patterns and at least a portion of object are detected. Each detected light pattern comprises a plurality of light elements and is detected from a single location. One or more detected light patterns are processed to provide a three dimensional representation of at least a portion of the object. The three dimensional representation of at least a portion of the object is used to estimate the physical parameter of the object.

This, and other aspects, can include one or more of the following features. The estimated physical parameter can be displayed.

Another innovative aspect of the subject matter described here can be implemented as a system for estimating a physical parameter of an object. The system includes a light projector comprising a light source configured to project one or more predetermined light patterns comprising a plurality of light elements onto at least a portion of the object. The system includes a detector configured to detect one or more light patterns comprising a plurality of light elements and resulting from an interaction of one or more projected light pattern and at least a portion of the object. The system includes a data processing apparatus configured to provide a three dimensional representation of at least a portion of the object by determining the three dimensional location of a plurality of light elements from a single detected light pattern detected from a single detector location, and uses the three dimensional representation to estimate the physical parameter of the object.

This, and other aspects, can include one or more of the following features. The detected light pattern processed to provide the three dimensional representation of at least a portion of the object can be based on a single projection of a predetermined light pattern onto at least a portion of the object. The light projector further can include an aperture from which one or more predetermined light pattern is projected. The detector can include an aperture into which one or more light patterns from the object is received and wherein the projector aperture is offset from the detector aperture. The light source can be a light flash apparatus. The light flash apparatus can be configured to produce a transient flash of light. The data processing apparatus can further be configured to estimate a physical measurement of the object from the three dimensional representation of at least a portion of the object. The object can be a swine and the physical measurement can be selected from the group consisting of crown-rump length, heart girth, front leg circumference below the elbow, elbow to elbow distance, flank to flank distance, front leg length, crease to crease length, hock circumference, rear leg circumference at groin, width at shoulders, ham width, width at ham crease, width at maximum ham protrusion, belly clearance, height at scapula, height above hip, and height at tail insertion. One or more physical measurement can be used to estimate the weight of the swine. The crown-rump length multiplied by the ham width multiplied by the tail insertion height can be used to estimate the weight of the swine.

Another innovative aspect of the subject matter described here can be implemented as a computer-implemented method for determining a position of an object on a surface. One or more predetermined light patterns are projected onto at least a portion of the object and onto at least a portion of the surface. Each projected light pattern includes a plurality of light elements. One or more light patterns are detected on the object and on the surface resulting from an interaction of the one or more projected predetermined light patterns and at least a portion of the object and at least a portion of the surface. The detected light patterns comprise a plurality of light elements. The three dimensional location of a plurality of light elements included in the detected light patterns is determined. A three dimensional representation of at least a portion of the object and a three dimensional representation of at least a portion of the surface is determined from the determined three dimensional locations of the plurality of light elements from the detected light patterns. A position of the object relative to the surface is determined based on the determined three dimensional representations of at least a portion of the object and at least a portion of the surface.

This, and other aspects, can include one or more of the following features. Determining the position of the object relative to the surface can include determining an orientation of the object with respect to the surface. For example, the orientation is normal to the surface on which the object is resting. The surface can be a substantially planar surface. For example, the object is a pig and the surface is a planar surface as found in a commercial hog farm. In such a scenario, the pig and consequently the three dimensional representation of at least a portion of the pig is in the vertical, "upright" position, for example, the standing position. The orientation of the object with respect to the surface can be determined using a vector normal to the surface. The three dimensional representation of at least the portion of the object can be used to estimate a physical parameter of the object based on the vertical orientation of the object with respect to the surface.

Another innovative aspect of the subject matter described here can be implemented as a computer-implemented method for determining a position of an object on a surface. One or more first predetermined light patterns are projected onto at least a portion of the object. Each first projected light pattern comprising a plurality of light elements. One or more second predetermined light patterns are projected onto at least a portion of the surface on which the object is positioned. Each second projected light pattern comprising a plurality of light elements. One or more light patterns on the object resulting from an interaction of the one or more projected first predetermined light patterns and at least a portion of the object are detected. Each detected light pattern on the object comprises a plurality of light elements. One or more light patterns on the surface and resulting from an interaction of the one or more projected second predetermined light patterns and at least a portion of the surface are detected. Each detected light pattern on the surface comprises a plurality of light elements. The three dimensional location of a plurality of light elements included in the detected light pattern on the object is determined. The three dimensional location of a plurality of light elements included in the detected light pattern on the surface is determined. A three dimensional representation of at least a portion of the object and a three dimensional representation of at least a portion of the surface from the determined three dimensional locations of the plurality of light elements from both the detected light pattern on the object and from the detected light pattern on the surface is determined. A position of the object relative to the surface based on the determined three dimensional representations of at least a portion of the object and at least a portion of the surface is determined.

This, and other aspects, can include one or more of the following features. One or more first predetermined light patterns and one or more second predetermined light patterns can be projected in a direction and the plurality of light elements of the first predetermined light pattern can be parallel to each other and to a first axis and the plurality of light elements of the second predetermined light pattern can be parallel to each other and to a second axis. The first and second axes may not be aligned. Determining the position of the object relative to the surface can include determining the orientation of the object with respect to the surface. The three dimensional representation of at least the portion of the object can be used to estimate a physical parameter of the object based on the orientation of the object with respect to the surface. The physical parameter can be weight. The object can be a farm animal standing on the surface. The object can be a three-dimensional object that is resting on top of the surface. Projecting a first predetermined light pattern onto at least the portion of the object can include projecting a first predetermined light pattern for a single instant. A first predetermined light pattern and a second predetermined light pattern can be projected as a flash of light, for example, a single flash of light.

Another innovative aspect of the subject matter described here can be implemented as a computer-implemented method for estimating a physical parameter of an object. The method includes projecting one or more diagonal light patterns onto at least a portion of the object. Each projected diagonal light pattern comprises a plurality of light elements. Each light element is parallel to an axis that is diagonal to a vertical axis that lies on a plane perpendicular to the direction in which the one or more diagonal light patterns is projected. One or more light patterns on the object resulting from an interaction of one or more of the projected diagonal light patterns and at least a portion of the object are detected. Each detected light pattern comprises a plurality of light elements. A three dimensional representation of at least a portion of the object is provided by determining the three dimensional location of a plurality of light elements of the one or more detected light patterns on the object. The three dimensional representation of at least a portion of the object is used to estimate the physical parameter of the object.

This, and other aspects, can include one or more of the following features. The one or more detected light patterns processed to provide the three dimensional representation of at least a portion of the object can be based on a single projection of a predetermined light pattern onto at least a portion of the object. The one or more detected light patterns can be detected from a single location on the object. One or more vertical light patterns can be projected onto at least a portion of a surface on which the object is positioned. Each projected vertical light pattern can include a plurality of light elements. Each light element can be parallel to the vertical axis that lies on the plane perpendicular to the direction in which the one or more diagonal light patterns are projected. One or more light patterns resulting from an interaction of one or more of the vertical light patterns and at least a portion of the surface can be detected. Each detected light pattern can include a plurality of light elements. A three dimensional representation of at least a portion of the surface can be provided by determining the three dimensional location of a plurality of light elements of the one or more detected light pattern. The three dimensional representation of at least a portion of the surface can be used to determine a position of the object on the surface.

Another innovative aspect of the subject matter described here can be implemented as an apparatus for estimating a physical parameter of an object positioned on a surface. The apparatus includes a light projector including a light source to emit light, and a device positioned in a path of the light emitted by the light source that selectively blocks at least a portion of the emitted light to produce a first pattern of light for projection onto at least a portion of the object and a second pattern of light for projection onto at least a portion of the surface. The apparatus also includes a detector configured to detect light patterns resulting from an interaction of the first light pattern and the object and the second light pattern and the surface. The apparatus also includes a data processing apparatus configured to perform operations comprising determining a position of the object relative to the surface based on the light patterns detected by the detector, and determining a physical parameter of the object based on the light patterns detected by the detector.

This, and other aspects, can include one or more of the following features. The device that selectively blocks at least a portion of the emitted light to produce a first pattern of light for projection onto at least a portion of the object and a second pattern of light onto at least a portion of the surface can be selected from the group consisting of a transparent surface comprising light blocking portions, a stencil and a digital micromirror device. The transparent surface can include a first plurality of markings oriented in a first direction on the transparent surface and a second plurality of markings oriented in a second direction on the transparent surface. The first direction can be different from the second direction. The light projector projecting light that passes through the first plurality of markings to produce a first light pattern can include a plurality of light elements for projection onto an object. Projecting light through the second plurality of markings to produce a second light pattern can include a plurality of light elements for projection onto the surface on which the object is positioned. The light projector further can include optics to transmit light from the light source through the first plurality of markings and the second plurality of markings on the transparent surface. The transparent surface can be a slide. The first plurality of markings can be diagonal etch marks and the second plurality of markings can be vertical etch marks on the slide. The light projector and the detector can be positioned on the same horizontal plane when the apparatus is in operation. The apparatus can additionally include a housing within which the light projector and the detector are positioned. The housing can include a plurality of openings through which the light projector projects light and the detector detects light patterns. The detector can include a charge coupled device (CCD) to capture the detected light patterns. The detector can be configured to detect the first detected light patterns resulting from an interaction of the first light pattern and the object, and the second detected light patterns resulting from an interaction of the second light pattern, and the surface. The apparatus can further include processing circuitry configured to provide a three dimensional representation of at least a portion of the object and a three dimensional representation of at least a portion of the surface by determining the three dimensional locations of the plurality of light elements included in the first and second detected light patterns, respectively.

Another innovative aspect of the subject matter described here can be implemented as a system that includes a light projector configured to project one or more diagonal light patterns onto at least a portion of an object, wherein each projected diagonal light pattern comprises a plurality of light elements, wherein each light element is parallel to an axis that is diagonal to a vertical axis that lies on a plane perpendicular to the direction in which the one or more diagonal light patterns are projected, a detector configured to detect one or more light patterns on the object and resulting from an interaction of one or more of the predetermined diagonal light patterns and at least a portion of the object, wherein each detected light pattern comprises a plurality of light elements, and processing circuitry configured to provide a three dimensional representation of at least a portion of the object by determining the three dimensional location of a plurality of light elements on the object of the one or more detected light pattern, and use the three dimensional representation of at least a portion of the object to estimate the physical parameter of the object.

This, and other aspects, can include one or more of the following features. The projector can further be configured to project one or more vertical light patterns onto at least a portion of a surface on which the object is positioned. Each projected vertical light pattern can include a plurality of light elements. Each light element can be parallel to the vertical axis that lies on the plane perpendicular to the direction in which the one or more diagonal patterns are projected. The detector can further be configured to detect one or more light patterns on the surface and resulting from an interaction of one or more of the predetermined vertical light patterns and at least a portion of the surface. Each detected light pattern can include a plurality of light elements. The processing circuitry can further be configured to provide a three dimensional representation of at least a portion of the surface by determining the three dimensional location of a plurality of light elements on the surface of the one or more detected light pattern, and use the three dimensional representation of at least a portion of the surface to determine a position of the object on the surface.

The details of one or more embodiments of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

Methods, apparatuses, and systems for estimating physical parameters using three dimensional representations are described in this disclosure. As described with reference to the following figures, physical parameters of an object are estimated using three dimensional representations obtained by the interaction of light patterns that are incident on the object. A light pattern is any pattern of light that can be projected onto an object for detection and subsequent representation, for example, in three dimensions. The light pattern can include multiple light elements. The light pattern can optionally be a structured light pattern. In one example structured light pattern, each light element can be a stripe that is parallel to the other light elements of the pattern. In another example structured light pattern, each light element can be a coded target. To estimate the physical parameters, a device shines a light pattern on an object of interest and captures an interaction of the light pattern with the object. An example of such a device is described with reference to FIG. 1. Another example of such a device is described with reference to FIGS. 3-4 and 10-13.

Figure 1:
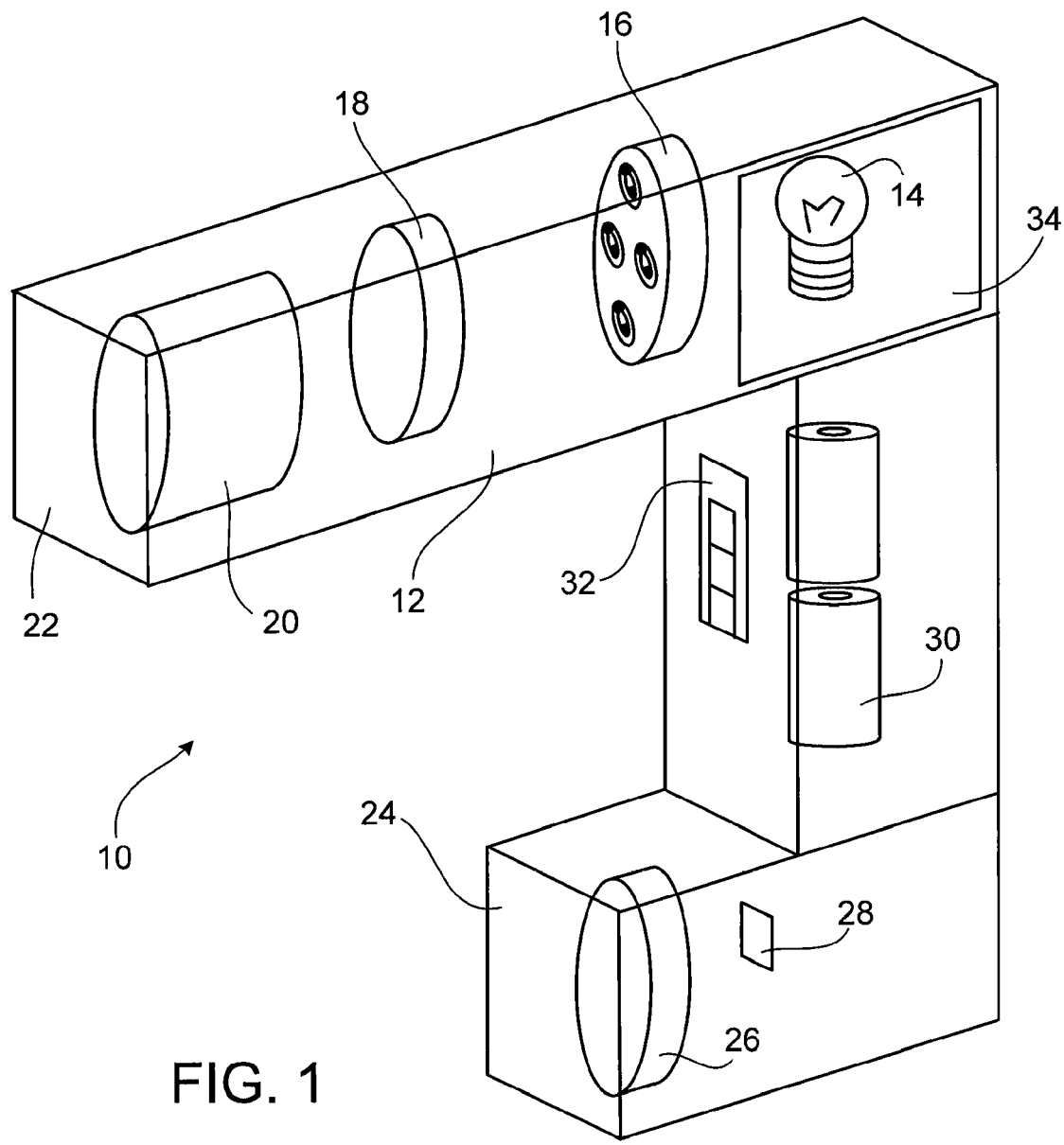
FIG. 1 is a schematic diagram illustrating portions of an example device for estimating a physical parameter of an object.

FIG. 1 is a schematic diagram of a device 10 for estimating a physical parameter of an object using a three dimensional representation of at least a portion of the object. The device 10 is configured to project a light pattern onto an object and to receive a light pattern from the object. The received light pattern from the object comprises a light pattern resulting from the interaction of the projected light pattern and at least a portion of the object.

While the object is not limited to a living being, in one example, the object is an animal or a portion of an animal. For example, the object can be a human or non-human animal. Optionally, the object is livestock animal, such as a pig, cow, goat, sheep, fish, horse, or the like. The animal can be a male or female animal of any age. Alternatively, or in addition, the object can be any type of poultry or a portion of poultry.

Portions of the device 10 can be located in a housing 12. Optionally, the housing 12 is configured to be hand held by an operator of the device 10. When the housing is hand held, the device can be moved within the object's environment for use in producing the three dimensional representation of at least a portion of the object. Thus, for example, if a livestock animal is the object for which a three dimensional representation will be produced, then the device 10 can be freely moved relative to the livestock animal while the animal is unrestrained in its natural commercial environment.

The device 10 can comprise a light source 14 which is located in the housing 12. The light source 14 can be a flash type light source (for example, a flash bulb) that can produce a transient flash of light for projection onto an object. Flash type light sources are commonly used in the optics field. For example, familiar flash type light sources are used in cameras to flash light onto objects for capturing their image. The device 10 can further comprise a human machine interface 32, such as a trigger, which can be used to trigger projection of light from the light source towards the object.

A slide 16, which can be made of glass or another light transmitting material, can be located in the housing 12 and operatively positioned between the light source 14 and the object. The slide 16 comprises a know pattern. For example, one or more known patterns can be printed or etched onto the slide 16. In one example, the slide is a glass slide that has a mirrored surface. The mirrored surface can have a portion of its mirroring etched away using acid to produce a known pattern of non-mirrored surface on the slide. The pattern is projected as a plurality of light elements from the slide when light from the light source 14 is transmitted through the slide and towards the object. Optionally, the pattern on the slide 16 comprises a plurality of elements that cause projection of a plurality of corresponding light elements onto the object or a portion thereof. The location of each element is known. It will be appreciated that light patterns can be produced using objects other than or in addition to slide 16. For example, a digital micro-mirror such as a digital light projector (DLP) can be used. Alternatively, or in addition, light patterns can be produced using steel gobos (a stencil used to cast a pattern on a wall). The light pattern can be generated using any transparent surface having markings on the surface or any device that selectively blocks light from passing through or a combination of the two.

Figure 5:
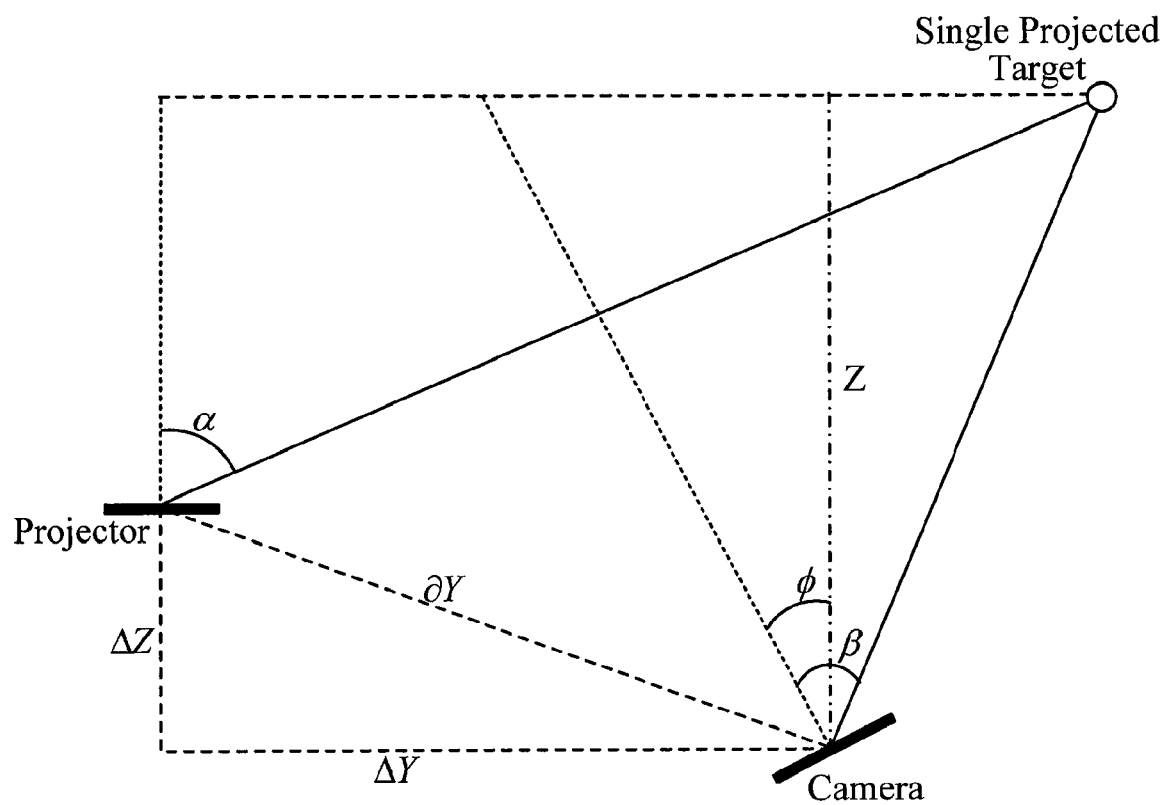
FIG. 5 is an illustration of an example triangulation method for use with the described devices, systems and methods.

Returning to FIG. 1, when light passes through the slide 16 from the light source 14, a pattern of light having a plurality of light elements is created. Because the location of each element of the slide 16 is known the projected light pattern is also known. This pattern of light is optionally directed through a collection lens 18 and onto and through a projection lens 20, which focuses the pattern out of the aperture 22 and onto the object or a portion thereof. Optionally, the aperture 22 is protected by protective glass. The aperture 22 can also optionally be shuttered. Because the location of each element of the plurality of elements is known and the optics (for example projection angle) of the projection lens 20 is also known, the location where each element should fall on a perpendicular plane at any given distance from the projection lens 20 can be estimated. Further, the angle α at which each element is projected from the projector can be estimated. As shown in FIG. 5, α can be measured relative to the optical axis of a light projector apparatus.

Light projected onto at least a portion of the object interacts with the object, or portion thereof, and a resulting light pattern comprising a plurality of light elements can be detected. The resulting light pattern can be detected by a capture portion (for example, camera portion) comprising an aperture 24, lens 26 and detector 28. In some implementations, the capture portion and the projector portion can be calibrated to identify the intrinsic and extrinsic parameters of the capture portion and the projector to get accurate scan data. Based on the extrinsic parameters, the position of the projector and the camera in space, with respect to each other, and with respect to the object(s) being imaged, can be determined. To define the extrinsic parameters of the camera is to know its relative position and orientation in space, for any given three dimensional image. Intrinsic parameters are those internal to the projector or camera, for example, lens distortion (pin cushion and tangential), the focal length of the lens, the format size (for example, the size of the projection pattern slide or the CCD in millimeters, and the like), the principal point, which is the theoretical point at which all of the rays of projection intersect (for example, exact center of the CCD or slide in an ideal system).

In alternative implementations, the calibration can be applied by accounting for lens distortion in both the camera and the projector. The lens distortion can be applied to each ray of the camera individually. Typically the lens distortion can be approximated using a polynomial function f(x). The pixel locations are then distorted as f(Px,Py,Pz)=(Px1,Py1, Pz1) and the new equation for the camera rays would then be $$P = \begin{bmatrix} Cx \\ Cy \\ Cz \end{bmatrix} + t \begin{bmatrix} Px1 - Cx \\ Py1 - Cy \\ Pz1 - Cz \end{bmatrix}$$

In the case of the projector, to find the distorted intersections of the projection plane, the plane is broken into a series of rays which approximate the ray. These can be defined similarly as:

$$Proj = \begin{bmatrix} Dx \\ Dy \\ Dz \end{bmatrix} + t \begin{bmatrix} Prx1 - Cx \\ Pry1 - Cy \\ Prz1 - Cz \end{bmatrix}$$

The system can be calibrated by considering the projector to be an inverse camera that "sees" that pattern which it projects. The camera can be calibrated using a camera calibration technique that is known to those skilled in the art of optical engineering. A fixed, known pattern can be placed on a calibration surface. From this fixed, known pattern, an image acquired with the calibrated camera can be used to determine the 3D position of the calibration surface with respect to the camera. The projector can then be calibrated by finding the correspondences between the 2D points in the slide pattern and the 3D points that were projected onto the calibration surface. The projector calibration can determine the intrinsic and extrinsic parameters of the projector.

Light passing though the aperture 24 is focused by a lens 26 onto a detector 28. The detector 28 can be, for example, a charged-coupled device (CCD). The dimensions of the detector 28 are known. When light passes through the lens 26 and strikes the detector 28 at a specific pixel of the detector, if color is used, the color and intensity of the light is recorded at that pixel. By analyzing the color and intensity of a plurality of pixels, a pattern of light striking the detector 28 can be determined. Using this information, the angle β of the aperture 24 or lens 26 relative to the location of a given pattern element on the object when that element was captured measured relative to the light projection element can be estimated. Optionally, the aperture 24 is protected by protective glass. The aperture 24 can also optionally be shuttered. If color is not used, the detection of light can be accomplished in monochrome.

Figure 2:
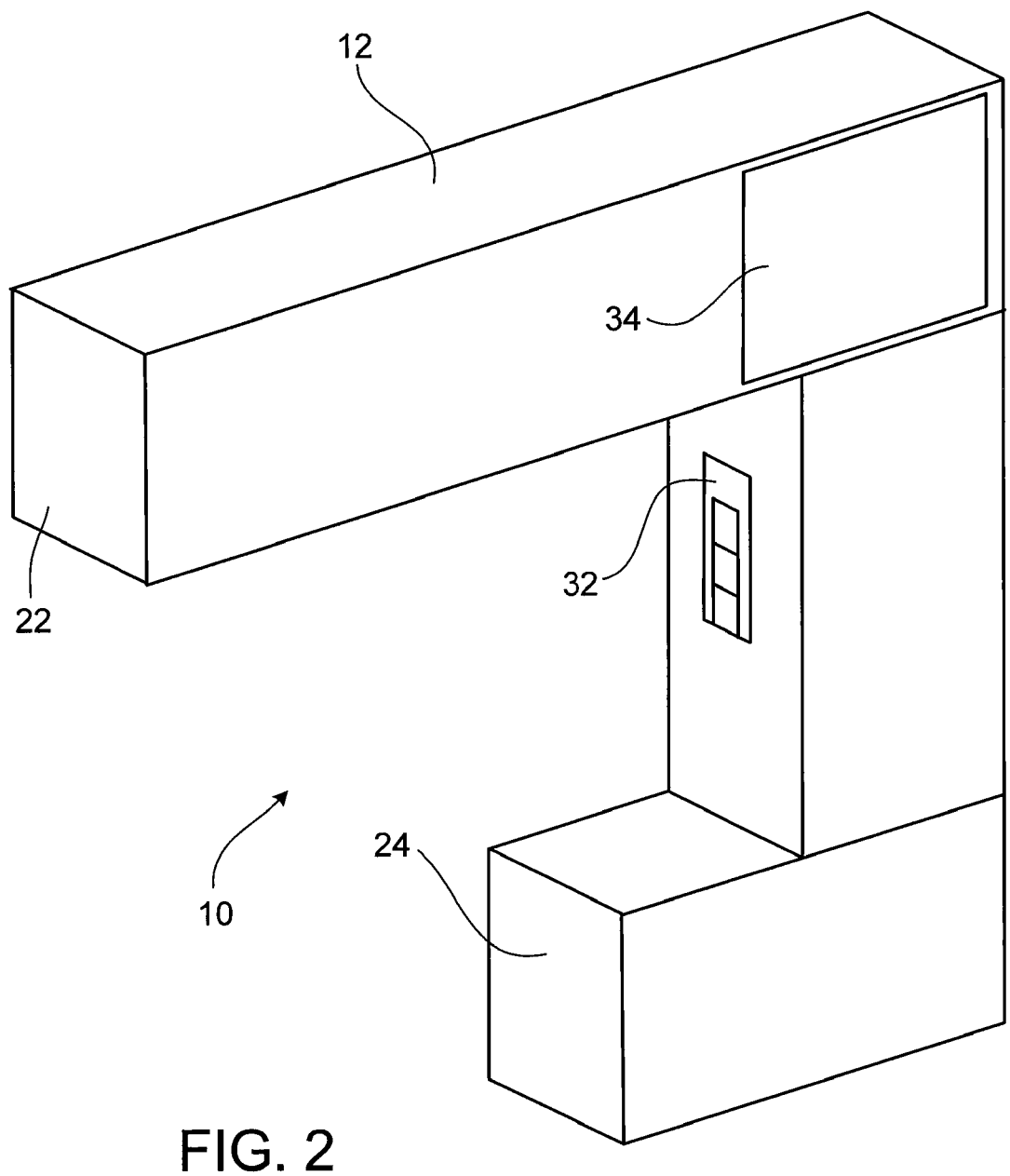
FIG. 2 is a schematic diagram illustrating portions of an example device for estimating a physical parameter of an object.

FIG. 2 is a schematic diagram illustrating portions of an example device for estimating a physical parameter of an object. As shown in FIG. 2, the device 10 includes the housing 12 which is opaque. FIG. 2 shows apertures (22 and 24), which can optionally be covered with protective glass. The figure further illustrates an optional display device 34 and a human machine interface 32 (for example, trigger control for causing a projection of light) integrated into the housing 12. The display device 34 can be a liquid crystal display (LCD) common to many digital cameras. The internal components of the device 10 shown in FIG. 1 are located within the housing.

Figure 3:
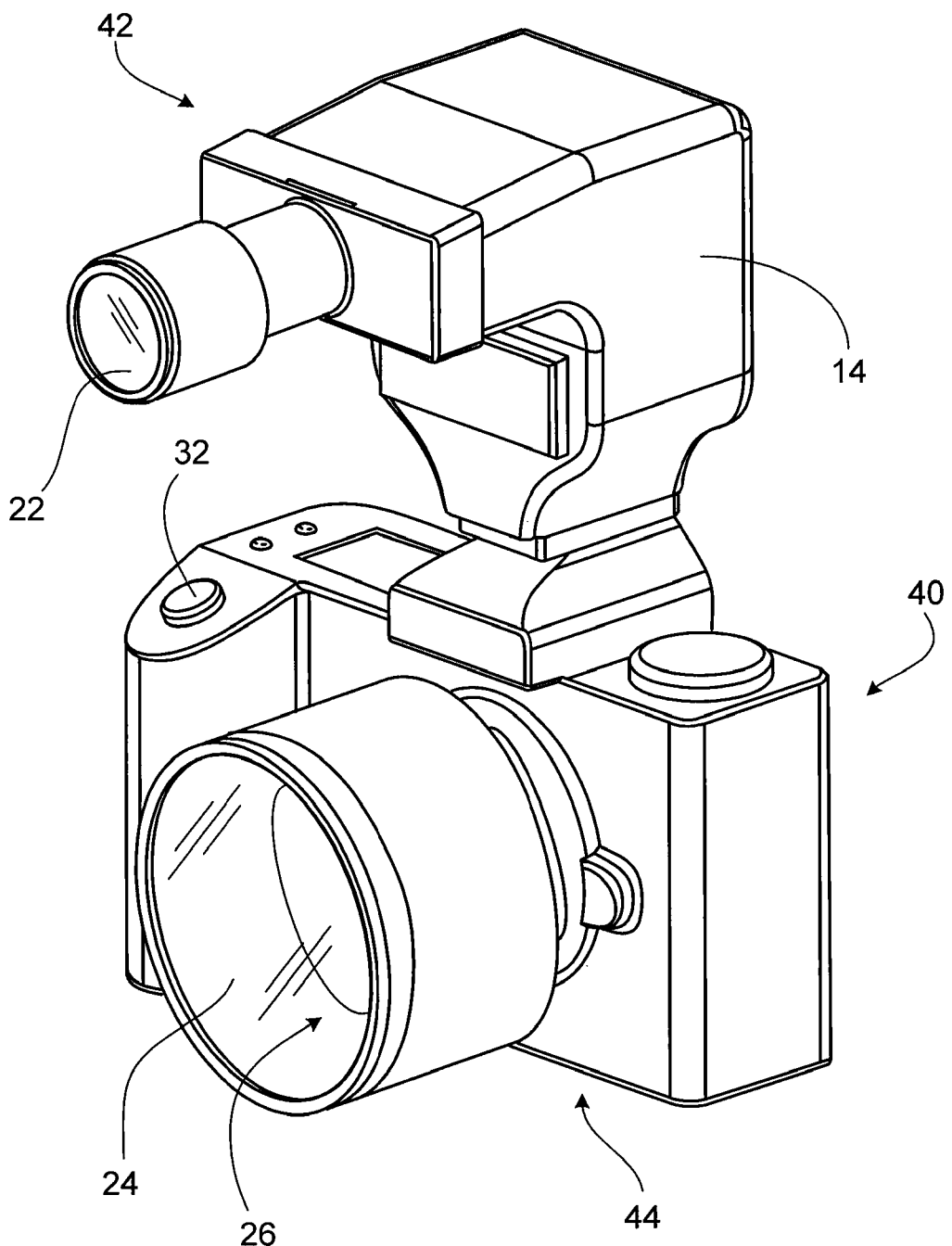
FIG. 3 is a schematic diagram illustrating portions of an example device for estimating a physical parameter of an object.
Figure 4:
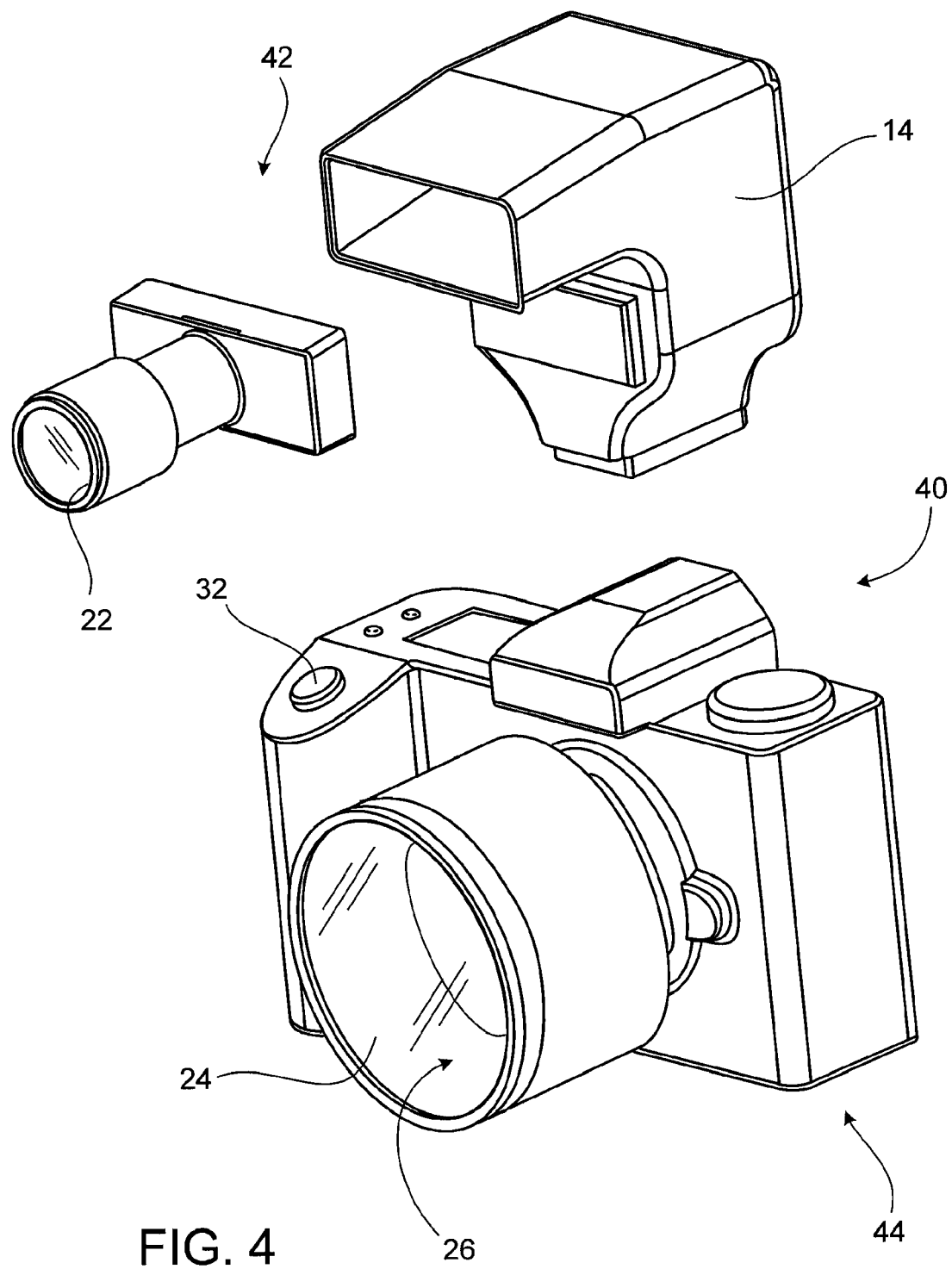
FIG. 4 is a schematic diagram illustrating portions of an example device for estimating a physical parameter of an object.

FIG. 3 and FIG. 4 are example schematic illustrations of a device 40 for estimating a physical parameter of an object. The device 40 comprises a projection portion 42 which comprises a light source 14 (for example, a camera-type flash apparatus) and an optics portion. The optics portion can comprise a slide 16, a collecting lens 18 and a projection lens 20. The aperture 22 of the optics portion proximate the object can be covered with a protective glass layer. The device 40 can further comprise a capture portion 44, such as a digital camera apparatus. The capture portion can comprise an aperture 24 covered with protective glass, a lens 26 (for example, a camera lens), and a detector 28. The device 40 can further comprise a human machine interface 32 for triggering projection of light from the light source 14 and for capture of an image using the capture portion 44.

Located within the capture portion is a detector 28 for detecting light though out the capture aperture. The device 40 can also comprise a display device as is common to many digital cameras. The device can further comprise at least one processing device configured to produce a three dimensional representation of at least a portion of the object using a single light pattern detected from a single location of the detector relative to the object. The at least one processing device can be further configured to use the three dimensional representation to estimate a physical parameter of the object.

The device 10 can comprise at least one processing device configured for estimating the physical parameter. The at least one processing device can also be located remote from the device 10, and the device 10 can be in operative communication with the processing device for the estimation of physical parameter. The at least one processing device for estimating the physical parameter can be the same processing device as that used to produce the three dimensional representation of at least a portion of the object. The device 10 can further comprise a power source 30 (for example, batteries) for powering operations of the device.

Triangulation can be used to produce a three dimensional representation of at least a portion of the object. For example, the device 10 can comprise at least one processing device configured to provide a three dimensional representation of at least a portion of the object by determining a three dimensional location of a plurality of detected light elements from a single detected light pattern from the object. The light pattern can be detected from a single detector location. Thus, a light pattern from the object resulting from a single projection of the light pattern using the projector portion of the device 10 can be detected by the capture portion of the device 10.

When a single projection is used, the light pattern is projected only once from a single location onto at least a portion of the object. The single light pattern interacts with a least a portion of the object and a resulting pattern is detected by the capture portion of the device 10. The detected pattern can therefore result from a single projected light pattern projected from a single location of the projector portion of the device 10.

Since the offset between the projector portion and the camera portion is also known, the three dimensional location (X, Y, Z coordinates) of a plurality of the light elements of the pattern projected onto the object can be estimated. For example, by assuming the camera is the origin (0,0,0), the distance to object Z can be estimated by analyzing the angles $\alpha$ and $\beta$. The at least one processing device can also be located remote from the device 10 and the device 10 can be in operative communication with the processing device for producing the three dimensional representation. For example, the at least one processing device can be located in a laptop or other computer remote and in communication with the device 10.

FIG. 5 is an illustration of an example triangulation method for use with the described devices, systems and methods. FIG. 5 shows an example Z coordinate estimation using triangulation. Each element of the projected pattern is identifiable using the detected pattern from the object (for example, captured image). The angle of each target element (for example, light element projected on the object), $\alpha$, and the captured angle of each target element, $\beta$, can be used to estimate the distance Z to the object, or portion thereof. In FIG. 5, $\partial y$ is the distance between the projector and camera, $\Delta Y$ is the offset in the Y direction of the projector and $\Delta Z$ is the offset in the Z direction of the projector.

Therefore:

$$Z = \frac{\Delta Y + \text{Tan}(\alpha)\Delta Z}{\text{Tan}(\alpha) - \text{Tan}(\beta - \phi)}$$

In alternative implementations, the example triangulation method includes defining define a Cartesian coordinate system in relation to the projector with the Z-axis coinciding with the central projection axis of the projector. In such implementations, the X-Z plane coincides with the horizontal sheet of light cast by the projector. This sheet of light defines a wedge shaped plane of projection. Each stripe in the structured light pattern creates a corresponding wedge. If the center of projection is (0,0,0) then the plane can be defined as:

$$y - Y_o z = 0$$

The camera image can then be seen as a series of rays which are defined by the pixels (Px,Py,Pz) and the center of the camera lens (Cx,Cy,Cz), each ray, P, can be defined with the following equation:

$$P = \begin{bmatrix} Cx \\ Cy \\ Cz \end{bmatrix} + t \begin{bmatrix} Px - Cx \\ Py - Cy \\ Pz - Cz \end{bmatrix}$$

The intersection of each of these rays with the wedge shaped planes created by the projector, define the XYZ coordinates of the object. The intersection of the rays with the planes can be solved using the following equation:

$$0 = Cy + t(Py - Cy) - Y_o[Cz + t(Pz - Cz)]$$

The remaining X and Y coordinates can be estimated by using the optics of either the projector or camera portions alone, where X is the pixel location on the detector 28 divided by the number of pixels per millimeter (mm) detector multiplied by the distance to the target element (for example, light element projected on the object) divided by the focal length of the lens. Similarly, Y can be estimated by using the pixel location of the target pattern element on the Y direction of the detector 28. The X, Y and Z coordinates can be determined for a plurality of light elements on the object and the resulting information can be used to produce a three dimensional representation of at least a portion of the object.

The three dimensional representation of the object can then be used to estimate a physical parameter of the object. The physical parameter can optionally be a non-geometric physical parameter. A geometric physical parameter is a parameter inherent in scan data received using the described methods and systems, such as, for example length or height of an object or a portion thereof. Thus, geometric physical parameters are physical measurements of the object that can be calculated based on the scan data. For swine, examples of geometric physical parameters, or physical measurements, include crown rump length, heart girth, front leg circumference below the elbow, elbow to elbow distance, flank to flank distance, front leg length, crease to crease length, hock circumference, rear leg circumference at groin, width at shoulders, ham width, width at ham crease, width at maximum ham protrusion, belly clearance, height at scapula, height above hip, and height at tail insertion, to name a few. The physical measurements can be obtained by determining multiple parameters including, for example, a distance between the points on the ham and shoulder which have the maximum depth, a distance between the midpoint of the line, and the projection of this line onto the belly of the pig, a curvilinear surface distance between the ventral and dorsal aspect of the pig taken along the shoulder crease, a distance between the projection of the points with the maximum and minimum vertical coordinates at the shoulder crease, a circumference of a vertical section taken along midpoint between shoulder and ham creases, a distance between the projection of the points with the maximum and minimum vertical coordinates at the midpoint of the shoulder and ham creases, a curvilinear surface distance between the ventral and dorsal aspect of the pig taken along the midpoint, a distance between the projection of the points with the maximum and minimum vertical coordinates at the midpoint, a curvilinear surface distance between the ventral and dorsal aspect of the pig taken along the ham crease, a distance between the projection of the points with the maximum and minimum vertical coordinates at the ham crease, and the like.

Figure 6:
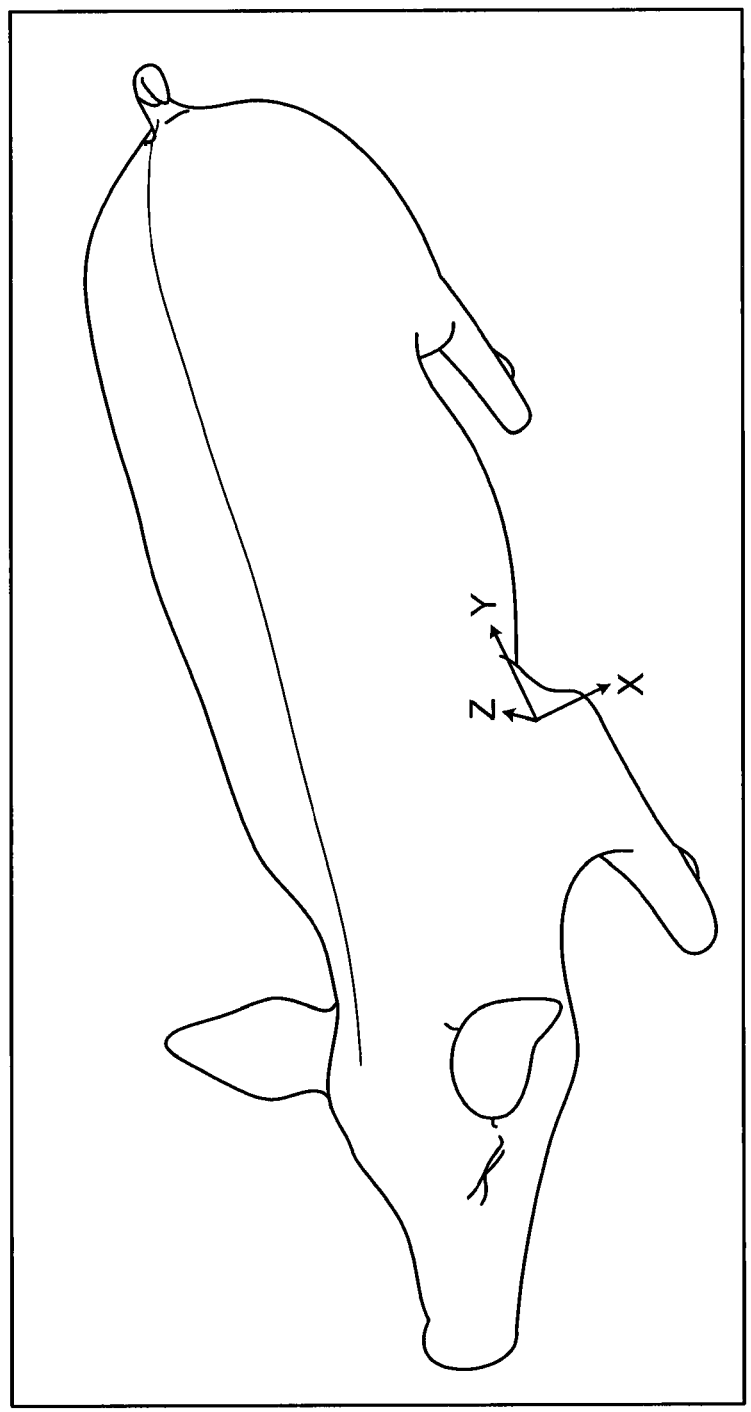
FIG. 6 is a schematic diagram of scan of a swine from which crown rump length is calculated.
Figure 7:
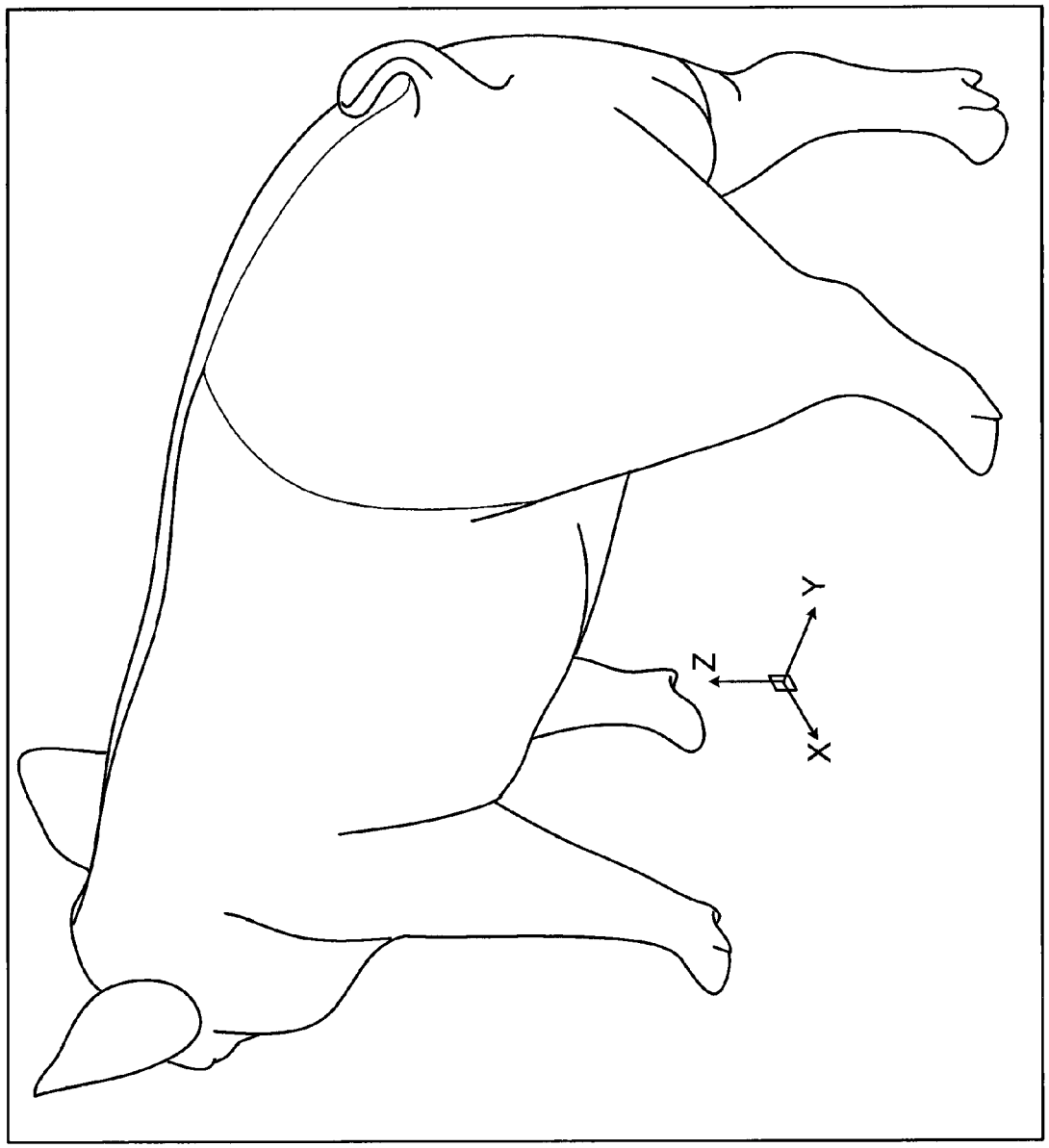
FIG. 7 is a schematic diagram of scan of a swine from which flank girth is calculated.
Figure 8:
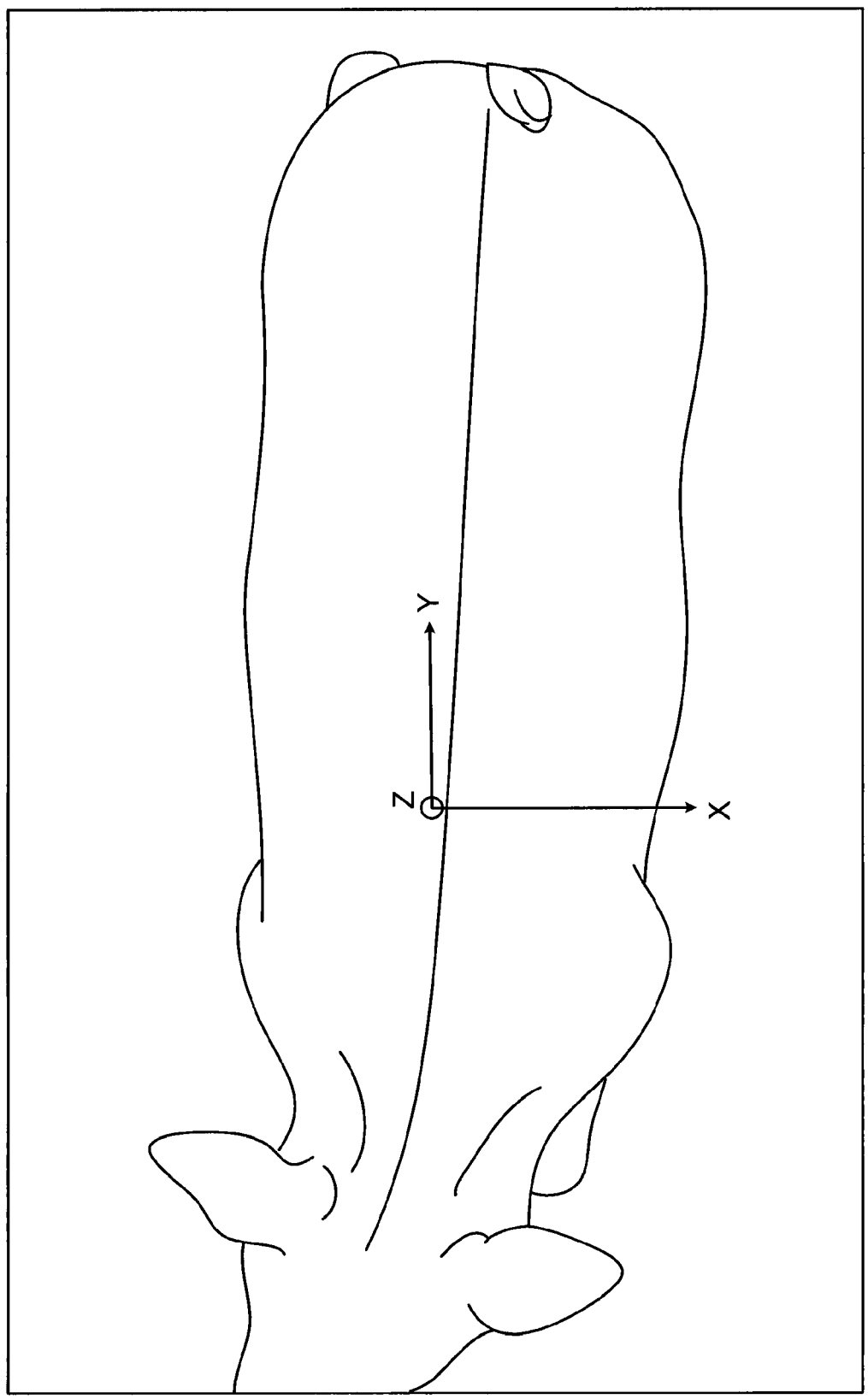
FIG. 8 is a schematic diagram of a scan of a swine from which ham width is calculated.

Crown rump refers to a measurement of swine anatomy which can be used as an estimate of the swine's length. As shown in FIG. 6, the "crown" is the point on top of the head, between the ears. The "rump" location is taken to be the tail insert location, or where the dorsal aspect of the tail meets the body. The crown rump length is then the surface distance between the crown point and the rump point. Flank girth refers to a measurement of swine anatomy which can be used as an estimate of the swine's girth. As shown in FIG. 7, this measurement starts at the ham flank point, the flap of skin that is created between the belly and the ham. The measurement is taken by taking a vertical surface line starting at the flank point and ending at the dorsal aspect of the object, for example, the spine. Tail height refers to a measurement of pig anatomy which can be used as an estimate of the pigs height. This measurement is taken by measuring the perpendicular distance between the floor plane and the tail insert point. Ham width refers to a measurement of pig anatomy which can be used as an estimate of the pig's width. As shown in FIG. 8, this measurement is taken by measuring the linear distance between the dorsal aspect of the pig and max ham point. The line between max ham and dorsal aspect of the pig is drawn perpendicular to the plane drawn normal to the floor through the dorsal aspect of the pig at the max ham location, because the dorsal aspect of the pig can be curved. The max ham point is the point on the ham farthest away from the dorsal aspect of the pig when the perspective of view is top down (perpendicular to the floor or any surface on which the swine is positioned).

A non-geometric physical parameter is a physical parameter that is not inherent in scan data received using the described methods and systems, such as, for example, weight, girth or body mass index of an object or portion thereof. The non-geometric physical parameter can be determined based on the geometric physical parameters, or physical measurements, calculated from the scans which, in turn, are obtained by projecting light patterns on the swine, as described above. For example, the crown-rump length multiplied by the ham width multiplied by the tail insertion height is used to estimate the weight of the swine. A volumetric quantity of crown-rump×ham width×tail insertion height, measured with calipers and tailor tape, showed good correlation with swine weight ($r^2$=0.97) for 25 swine. Further, the same volumetric quantity, measured from three dimensional scans, also showed good correlation with weight ($r^2$=0.97, N=25).

Figure 9A:
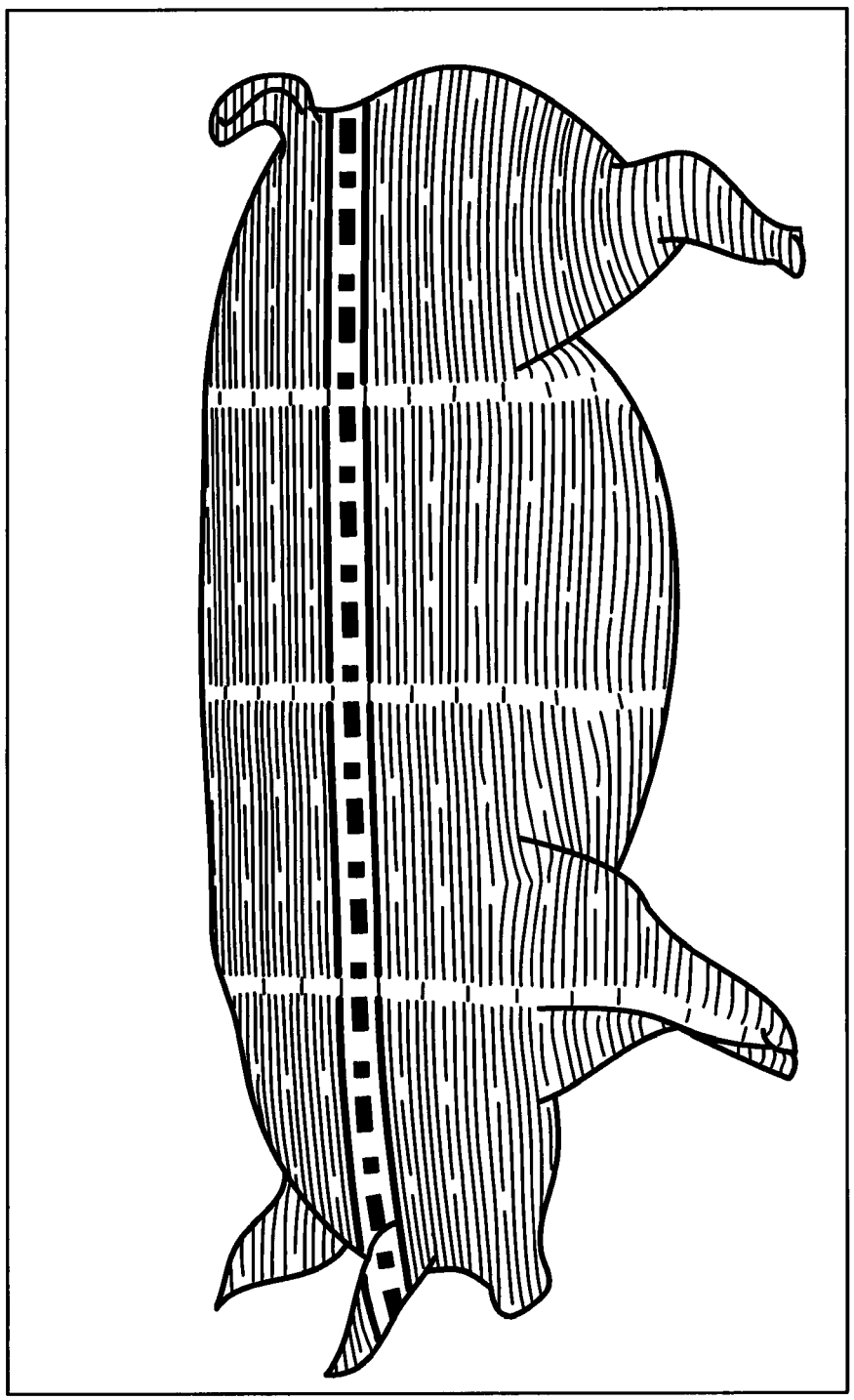
FIG. 9A is a raw image of a marked pig acquired using an example system described herein from the side.
Figure 9B:
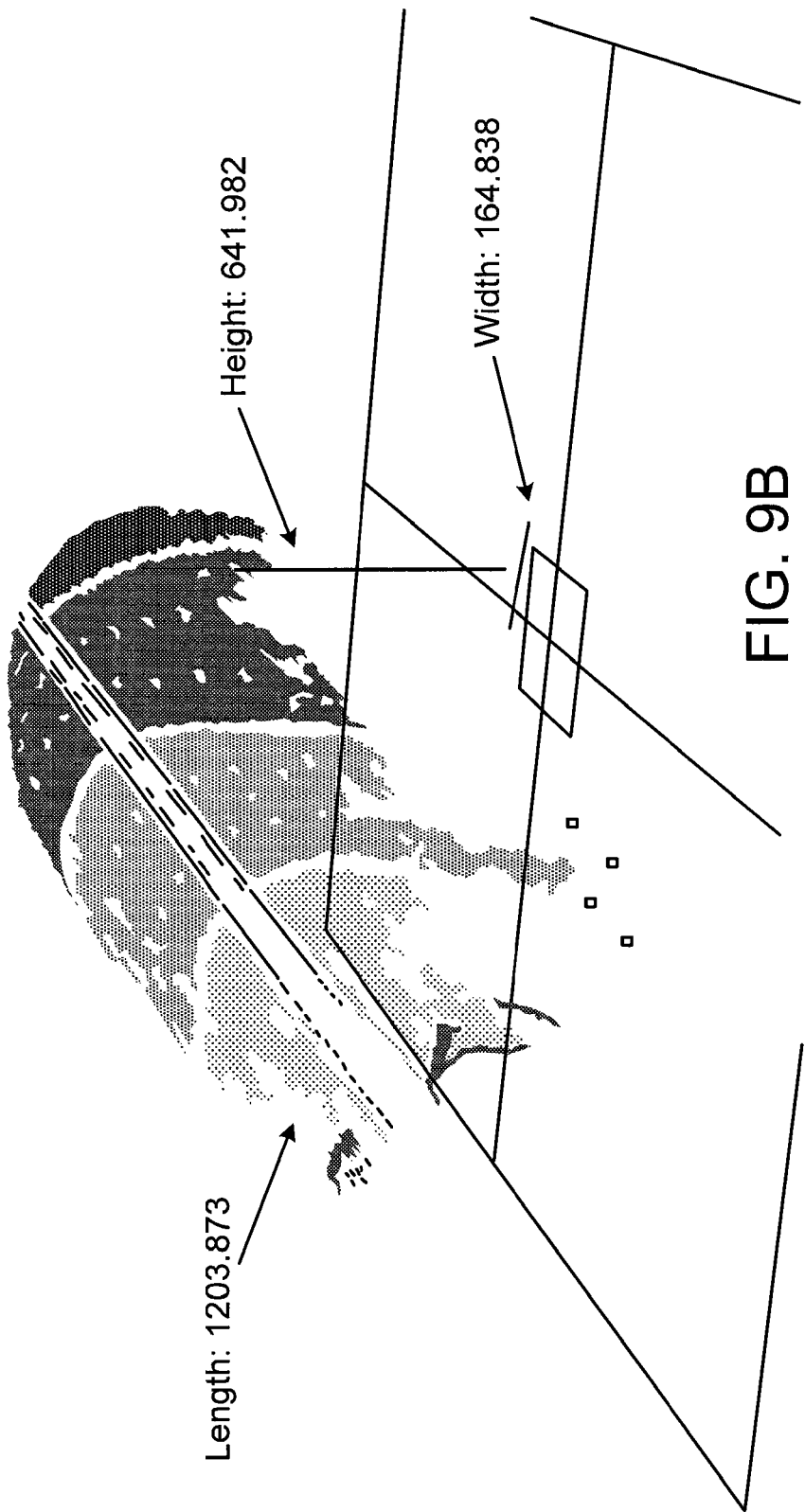
FIG. 9B is a three dimensional scan labeled with crown-rump length, tail insertion height, and ham width.

The three dimensional scans of the pigs can be taken from multiple angles, for example, side at human head height, side above head, from above the pig, three-quarters from the rear, i.e., from the side approximately two feet behind the tail. An image of the pig with a projected light pattern overlaid is shown in FIG. 9A. A three dimensional scan of the pig obtained from the image is shown in FIG. 9B. The squared correlation between the measurements obtained by three dimensional scans and weight is listed in the table below:

| Physical Measurement | $R^2$ (3-D scan) |
|---|---|
| Length (crown-rump) | 0.88 |
| Flank to Flank | 0.88 |
| Height tail-head down | 0.85 |
| Width-Ham | 0.70 |

As described previously, volume calculated based on the three dimensional scans showed good squared correlation with weight ($R^2$=0.97). When volume was estimated by replacing ham width with the flank to flank distance, the squared correlation remained high ($R^2$=0.94). In addition to weight, other example physical parameters that can be estimated using the techniques described here include surface area, girth, volume, length, height, carcass composition, primal cuts proportions, tissue (for example, fat, bone, lean) composition, muscling, body mass index (BMI), and/or body symmetry/asymmetry.

Thus, the weight of a livestock animal can be estimated from the three dimensional representation of at least a portion of the animal. As described previously, the weight of a swine can be estimated by multiplying the crown-rump length, the ham width, and the tail insertion height. By using a single detected light pattern, the animal can be unrestrained. For example, the animal can be in its natural environment in unrestrained motion. One scan (single projection event, single detection based on the single projection event) can be taken, and the data from one scan can be used to produce the three dimensional representation. Because one scan is taken, the scan is taken from one location relative to the object. It will be appreciated that multiple scans, i.e., multiple projection events, can also be taken to estimate the physical parameters.

In some implementations, to determine weight, or other physical parameters, from the three dimensional representation, the three dimensional representation can be compared to a standard representation. Optionally, the standard representation is a three dimensional representation of an object having similar characteristics to the object. In alternative implementations, described later, weight can be determined without comparing to any standard representation.

For example, the standard representation can be based on the same object or a portion of the same object for which the physical parameter is being determined. If, for example, the weight of a pig is being estimated, the standard can be a representation based on a pig. Optionally, the standard can be based on a representation of an animal of about or the same age as the object animal. Also, the standard can be optionally based on a representation of an animal of about or the same age, the same species, and/or the same breed as the object animal.

One example method for estimating weight from the three dimensional representation is to estimate the length of lines normal to the surface of the standard that intersect the three dimensional representation of the object after it has been registered with the standard object representation. These lengths can be taken from multiple positions across the standard (for example, ham, shoulder, belly, back) and used in a regression analysis to derive a weight prediction equation. The precision and accuracy of the weight estimates can be assessed and refined by stepwise analysis of alternative equation structures using proportion of variance accounted for by the equation (R-squared) as a measure of precision and/or accuracy.

Other example methods for estimating weight include using the three dimensional representation of the object (for example, a pig) to visually estimate the weight. However, for greater accuracy, reference points can be used to estimate some of the object's dimensions or to place the size of the object within a given range. Some methods of estimating weight from a three dimensional image include estimating a projected area from the side of the object and estimating weight based on the relationship between the side area and weight. For example, H. Minagawa, "Surface Area, Volume, and Projected Area of Japanese-Shorthorn Cattle Measured by Stereo Photogrammetry Using Non-metric Cameras," J. Agr. Met. 50(1):17-22 (1994) describes a correlation between side area of cattle and weight by image analysis. Further, a correlation between projected area and hog height have been reported to estimate hog weight. For example, $W=5.68\times10^{-4} A^{1.16} H^{0.522}$. See for example, Minagawa, H. "Estimating Pig Weight with a Video Camera," Proc of the Fifth International Livestock Environment Symposium, 453-620 (1997); Minagawa and Hosono, "A Light Projection Method to Estimate Pig Height," Proc. of the First International Conference of Swine Housing, 120-125 (2000); and Minagawa and Murakami, "A Hands Off Method To Estimate Pig Weight by Light Projection and Image Analysis," Livestock Environment VI: Proc. of the Sixth International Symposium 72-79 (2001). In other examples, sow weight has been estimated from a correlation of flank girth and weight. Thus, heart girth, area, and height can be derived from the three dimensional representation, which can be used to estimate weight. Also, cross sectional areas and volumes can be estimated from the three dimensional representation and used to estimate weight.

In yet another example, a three dimensional representation taken of the side of a pig from a height equal to the height of the pig can include surface details of one side of the pig from snout to tail and top of the back to the surface on which the pig is standing. Metrics that can be used to estimate weight from the three dimensional representation, include linear, curvilinear, angular, area and volumetric values. Provided the device 10 is aimed at the side of pig at right angles to the long axis of the pig, and by measuring accurately the perpendicular distance from the device 10 to the pig and the angles created between the device 10 and the front (for example midway between the ears) and rear (for example the point of insertion of the tail) of the pig's body, the metrics listed above can be obtained. To translate those metrics on a given pig into a weight estimate, one or more of these metrics can be used to estimate weight.

An initial set of pigs can be imaged and weighed to obtain early estimates of measurement variation. The number of pigs to be imaged for calculating and validating the weight-estimating accuracy is determined by running a series of data collections and analyses until a desired level of accuracy is achieved. This analysis, also known as "power of the test" analysis, can provide guidance on the size and structure of datasets to be collected for a pre-determined level of estimation error. Optionally, images and weights of 100 pigs are taken. Data collected by this analysis provide metrics that can then be statistically analyzed using stepwise regression, among other statistical techniques, to identify the set of metrics which best estimates body weight. The stepwise procedure can be repeated until the individual weight estimates are within, for example, +/−2% of the corresponding actual weights. Alternatively, or in addition, the procedure can be repeated until the average of the weight estimates is, for example, +/−2% of the actual average weight. Example stepwise regression procedures, for example, implemented in software applications, are available from SAS (SAS Institute Inc, Cary N.C.), Systat (Systat Software, Inc, Chicago, Ill.). Other statistical software packages are also commercially available.

In yet another example, about 100 pigs are imaged to obtain a partial three dimensional representation image which, when overlaid digitally (for example registered) on a standard image, is capable of providing a number of metrics to permit an analysis of subsets of these metrics using stepwise regression as described above, until the resulting individual weight estimates are within, for example, +/−2% of the corresponding actual individual weights.

The statistical equations resulting from either regression approach can be used by the at least one processing device for estimating a physical parameter such as weight. Thus, after a regression analysis is performed, characteristics of the three dimensional representation of the object can be input into the statistical equations to determine weight.

In yet another example, estimates of volume and density can be used to estimate weight. Using this method, volume can be determined from the three dimensional representation and known density estimates of tissue of that volume can be used to estimate weight. For example, a representative sample of pig cross sections can be obtained in order to evaluate density of each section. The three dimensional representation is used to simulate the body cross-sections from captured images. The volume (V) of each section, that is finite thickness, is then estimated and the density (D) estimate appropriate to that section is used to obtain section weight (W) estimates (W=V*D). The weight calculated for each cross-section, that is of finite thickness, can be summed over all sections to provide an estimate of the total weight of the animal. Any of the above approaches can also be combined, and likewise analyzed statistically for accuracy of estimating individual weights within, for example, +/−2% of the corresponding actual individual weights.

Figure 16:
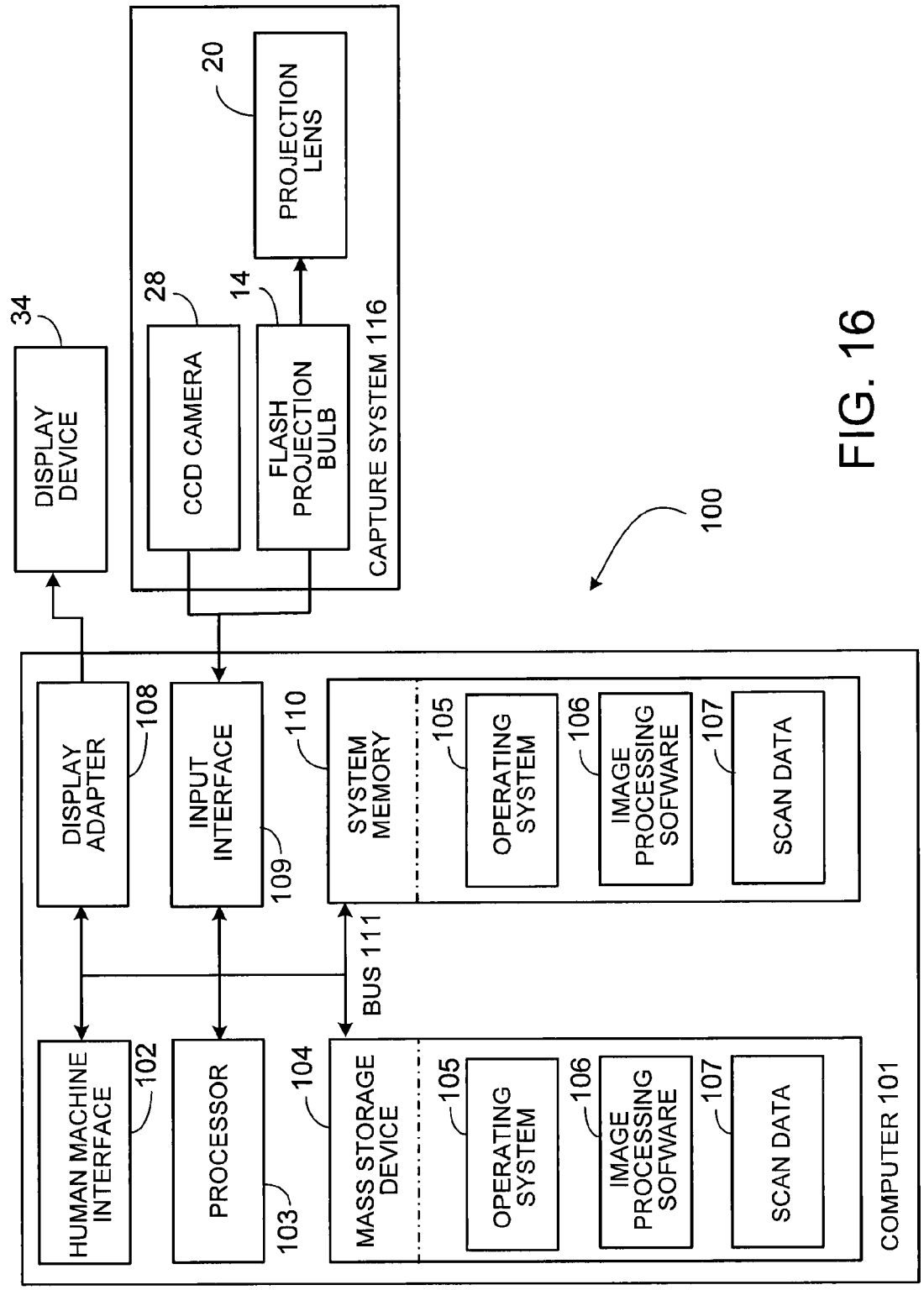
FIG. 16 is a block diagram illustrating portions of an example system for estimating a physical parameter of an object.

Also provided herein are systems for estimating the physical parameter of an object. The system can comprise a capture system 116, such as the device 10 and at least one processing device as described above. The processing device can be configured to produce a three dimensional representation of at least a portion of the object and to estimate a physical parameter of the object using the three dimensional representation. An example system 100 is shown in FIG. 16.

Also provided are methods for estimating a physical parameter of an object. The example devices and systems described above can be used in the disclosed methods. Example methods for estimating a physical parameter of an object comprise projecting one or more predetermined light patterns onto at least a portion of the object wherein each projected light pattern comprises a plurality of light elements. One or more light patterns resulting from an interaction of one or more of the projected light patterns and at least a portion of the object are detected, wherein each detected light pattern comprises a plurality of light elements and is detected from a single location. A single detected light pattern is processed to provide a three dimensional representation of at least a portion of the object by determining the three dimensional location of a plurality of light elements of the single detected light pattern. The three dimensional representation of at least a portion of the object is used to estimate the physical parameter of the object.

Optionally, the single detected light pattern processed to provide the three dimensional representation of at least a portion of the object is based on a single projection of a predetermined light pattern onto at least a portion of the object. Optionally, each single detection location is offset from the location from which the pattern is projected. The detection location can refer to the location of the detector or detection aperture and the location from which the pattern is projected can refer to the location of the projector or projection aperture. Optionally, the single location from which one or more of the light patterns is detected differs between one or more detected light pattern.

The physical parameter estimated using the example method can optionally be weight and the object can optionally be an animal, such as a mammal. In one aspect, the physical parameter estimated is weight and the animal is a livestock animal, such as a pig. The physical parameter can be a geometric or non-geometric physical parameter. The physical parameter can also be selected from the group consisting of weight, surface area, girth, length, height, carcass composition, primal cuts proportions, tissue composition, muscling, body mass index, body asymmetry and volume or from any subset of these parameters. For example, the physical parameter can be selected from the group consisting of weight, volume, carcass composition, primal cuts proportions, tissue composition, muscling, body mass index, and body asymmetry or any subset of these parameters.

To estimate the physical parameter, the three dimensional representation of at least a portion of the object can be optionally registered with a representation of a standard object to determine the orientation of the three dimensional representation relative to the standard object representation. For example, the orientation of at least a portion of the three dimensional representation can be compared to the orientation of the standard object representation to estimate differences in distances between portions of the three dimensional representation and portions of the standard object. Differences between the three dimensional representation of at least a portion of the object and the standard object representation can be used to estimate the physical parameter.

Thus, in one aspect, the physical parameter is weight and the use of the three dimensional representation to estimate the weight comprises comparing the three dimensional representation to a representation of a standard object. The compared representations are used to estimate the object's weight. Optionally, the object is a livestock animal of a given species and the standard object representation is based on a livestock animal of the same given species. Optionally, the object is a livestock animal of a given genetic type and the standard object representation is based on a livestock animal of the same given genetic type. Optionally, the object is a livestock animal of a given species or genetic type and the standard object representation is based on a livestock animal of the same given species or genetic type and having about the same age as the object livestock animal.

The physical parameter of the object can also be estimated by estimating the volume of one or more cross-sections of the object. For example, the physical parameter is optionally weight and the use of the three dimensional representation to estimate the weight comprises estimating the volume of one or more cross-sections of the object.

Also provided are example methods for estimating a physical parameter of an object that comprise projecting a plurality of predetermined light patterns having a plurality of light elements onto at least a portion of the object, wherein each pattern is projected onto the object from substantially the same angle. One or more light patterns resulting from an interaction of the projected light patterns and at least a portion of object are detected. Each detected light pattern comprises a plurality of light elements and is detected from a single location. One or more detected light patterns are processed to provide a three dimensional representation of at least a portion of the object. The three dimensional representation of at least a portion of the object can then be used to estimate the physical parameter of the object.

The device described with reference to the aforementioned figures represent an embodiment in which the projector and the detector are arranged on a vertical plane. In an alternative embodiment, described with reference to FIGS. 10-13, the projector and the detector are arranged on a horizontal plane.

Figure 10:
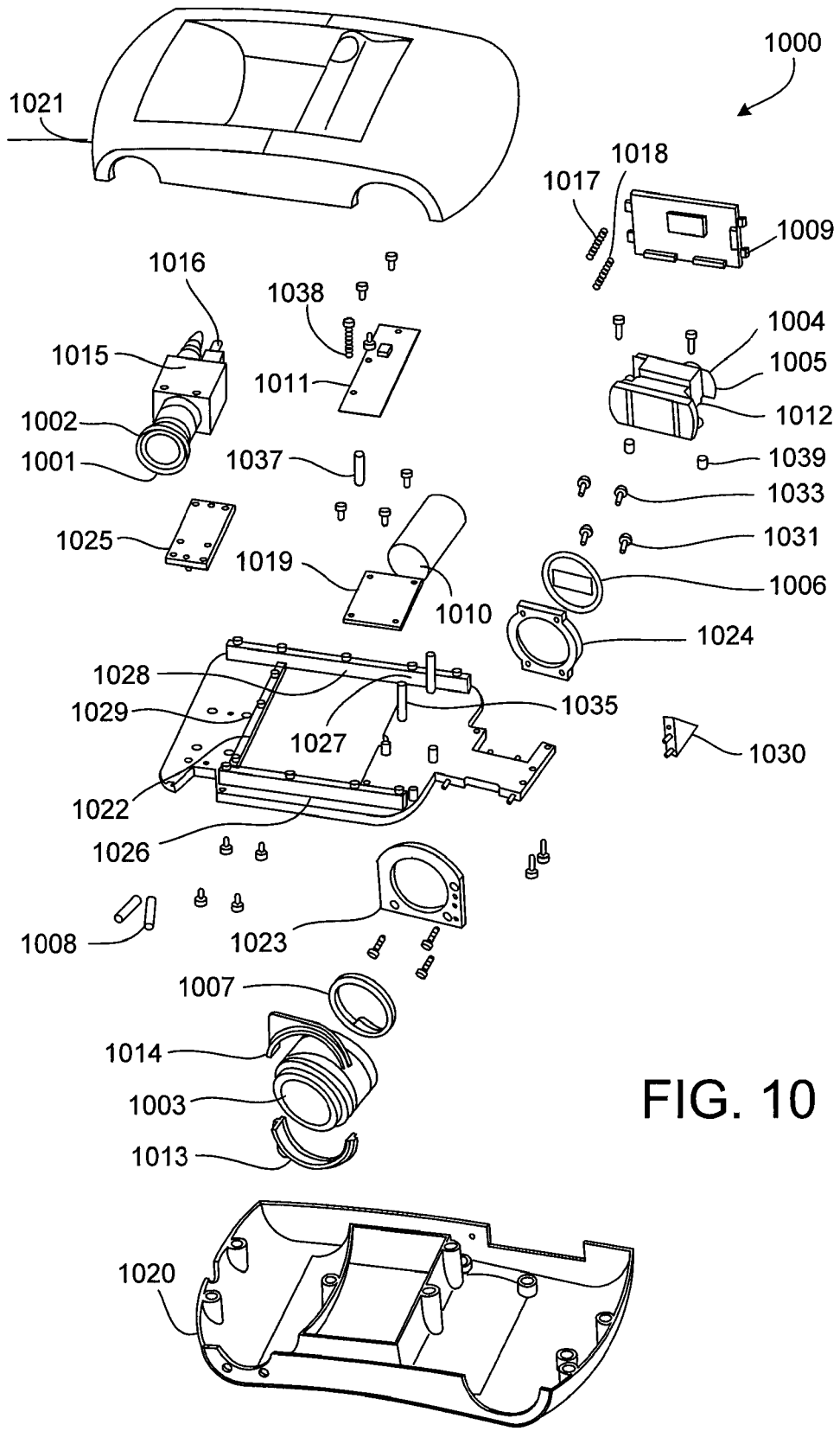
FIG. 10 is a schematic diagram illustrating an exploded view of an example device for estimating a physical parameter of an object.

FIG. 10 is a schematic diagram illustrating an exploded view of an example device 1000 for estimating a physical parameter of an object. Components of the example device 1000 are listed in the table below:

| Reference Numeral | Component |
| --- | --- |
| 1001 | Camera Lens |
| 1002 | Camera |
| 1003 | Flash Lens |
| 1005 | Diffuser |
| 1006 | Slide with bezel |
| 1007 | F Mount Adapter |
| 1009 | Scanner Display |
| 1011 | PCB Main |
| 1012 | Diffuser HV pattern |
| 1013 | Flash lens bottom insert |
| 1015 | Camera plug |
| 1017 | LED - Green |
| 1018 | LED - Red |
| 1019 | PCB High Voltage |
| 1020 | Scanner Housing |
| 1022 | Internal Chassis Plate |
| 1023 | Flash Lens Mount Bracket |
| 1025 | Camera Mounting Block |
| 1026 | Front Rib |
| 1028 | Rear Rib |
| 1029 | Side Rib |
| 1030 | Right Angle Rib |
| 1033 | Flat Washer |
| 1035 | Threaded Standoff |
| 1037 | Standoff |
| 1039 | Standoff |

In the example device 1000, the camera 1002 and the flash lens 1003 are arranged on the same horizontal plane. The camera lens 1001 can be an F-mount or C-mount camera lens that is commercially available. The camera 1002 can be a commercially available camera that can be operatively coupled to the processing device, for example, using a Universal Serial Bus (USB) coupling, fire-wire, a network board, and the like. The flash lens 1003 can be a commercially available camera lens such as an F-mount or C-mount used for projection. The diffuser 1005 can be a semi-transparent material or fully transparent glass lens used to evenly disperse the flash emitted light over the entire slide. The slide with bezel 1006 can be, for example, a gobo, glass etched with silver opaque material, that is used to create the light pattern(s). The F Mount Adapter 1007 can be a commercially available adapter used to hold the projection lens to the projection assembly. The scanner display 1009 can be a liquid crystal display (LCD) device, used to show the user the weight of the animal, live video of what the weight reader is seeing, and the like. In some implementations, the scanner display 1009 can be used as a graphical user interface (GUI), for example, a touch screen, and can be used to display messages, such as, error messages.

The PCB main 1011 is a circuit board used to receive the trigger signal from the user and to pass the signal to the camera, the flash, and the computer. The circuit board can be configured to synchronize the timing between the flash and the camera. The camera plug 1015 can be a commercially available camera connector used to connect the camera to the PCB main and to the computer. The LED Green 1017 can be a commercially available light emitting diode that can be used to indicate a message, for example, a good scan message. The LED Red 1018 can be a commercially available light emitting diode that can be used to indicate, for example, a bad scan message. The PCB High Voltage 1019 can be a printed circuit board used to charge and fire the flash. The scanner housing 1020 can be a shell that can include the main components of the hand held device. The housing can be selected to provide rigidity and can have an ergonomic design so that the device is held in the correct orientation. In addition, the housing can provide ingress protection and can be rugged in design.

The Internal Chassis Plate 1022 can be a component used to hold the camera and projector assemblies at a distance, independent of temperature changes. The flash lens mount bracket 1023 can be a component that can hold the f-mount and the flash lens to the internal chassis plate. The camera mounting block 1025 can be a component that can hold the C-mount and the camera lens to the internal chassis plate. The front rib 1026 can be a component used so that the chassis does not bend. The rear rib 1028 can be a component used so that the chassis does not bend. The right angle rib 1030 can be a component used so that the chassis does not bend.

Figure 11:
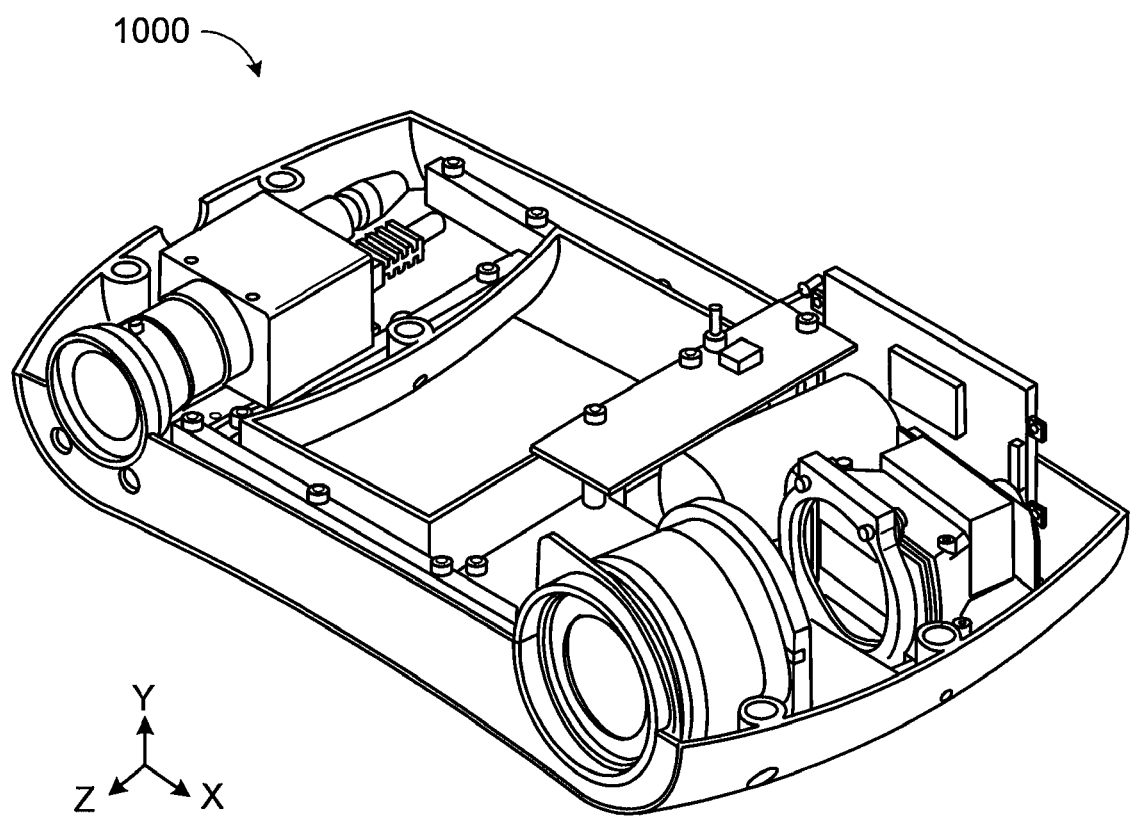
FIG. 11 is a schematic diagram illustrating an isometric view of the example device with top housing removed for estimating a physical parameter of an object.
Figure 12:
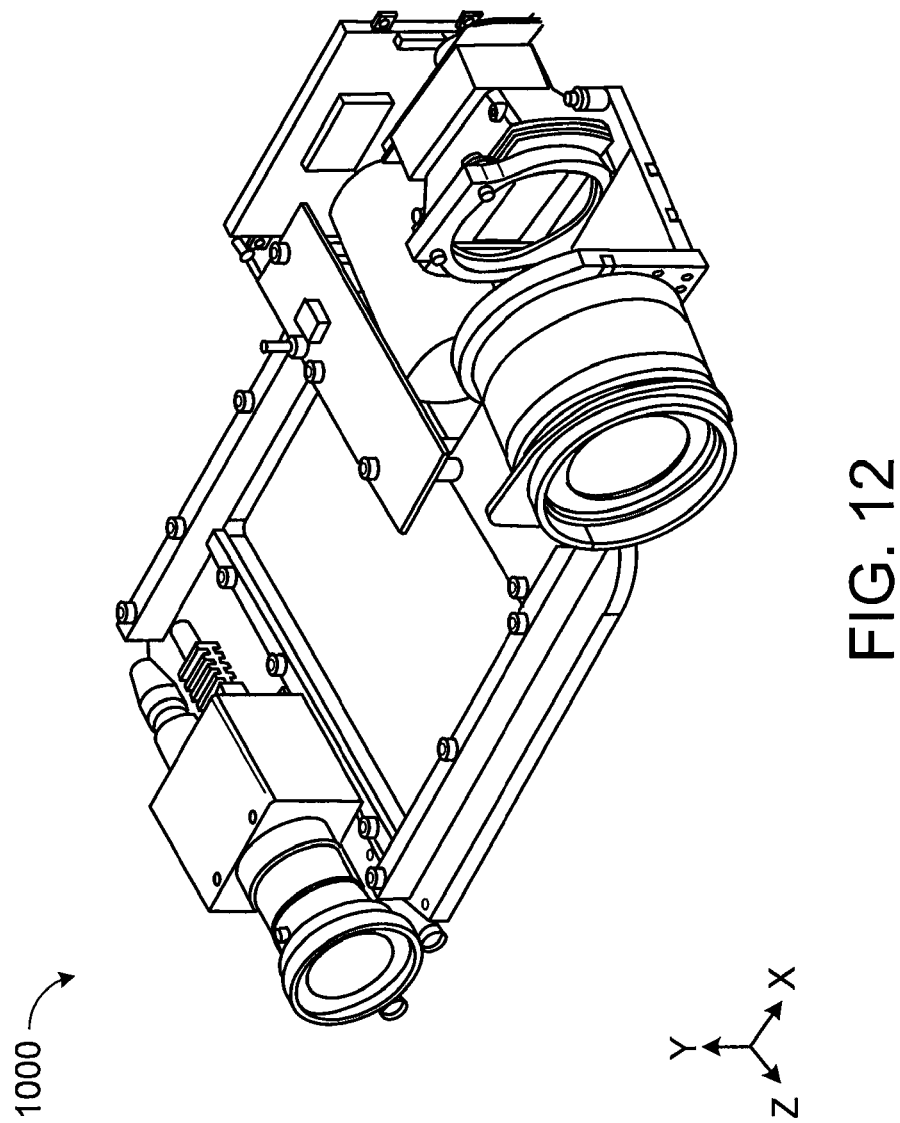
FIG. 12 is a schematic diagram illustrating an isometric view of the example device with the bottom housing removed.
Figure 13:
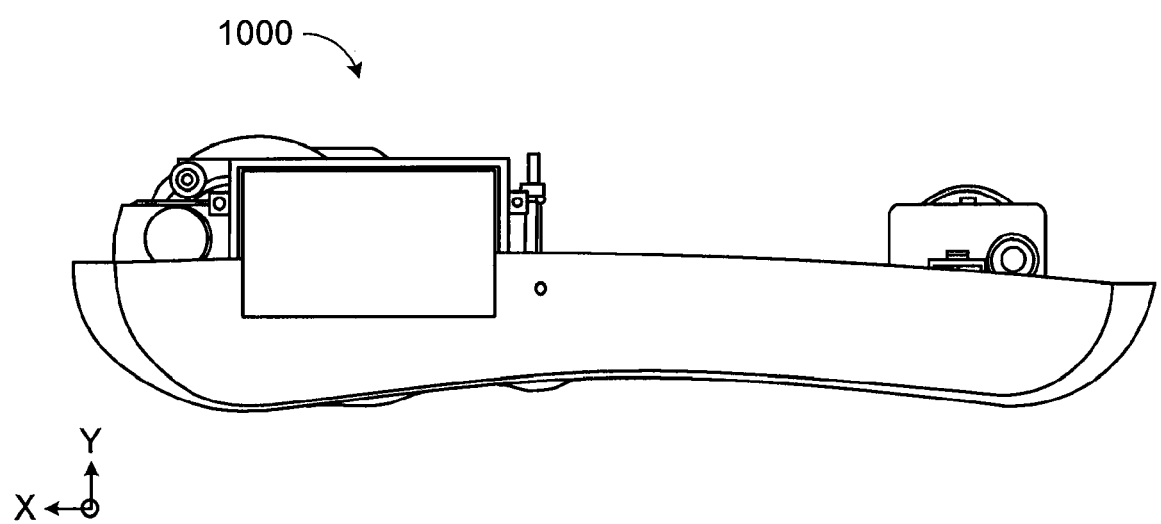
FIG. 13 is a schematic diagram illustrating a rear view of the example device with top housing removed.

FIG. 11 is a schematic diagram illustrating an isometric view of the example device 1000 with top housing removed for estimating a physical parameter of an object. As shown in FIG. 11, the camera 1002 is on the left side and the flash lens 1003, i.e., the projector is on the right side. Opening for the light pattern is below the camera lens 1001. FIG. 12 is a schematic diagram illustrating an isometric view of the example device 1000 with the bottom housing removed. FIG. 13 is a schematic diagram illustrating a rear view of the example device 1000 with top housing removed.

Figure 14:
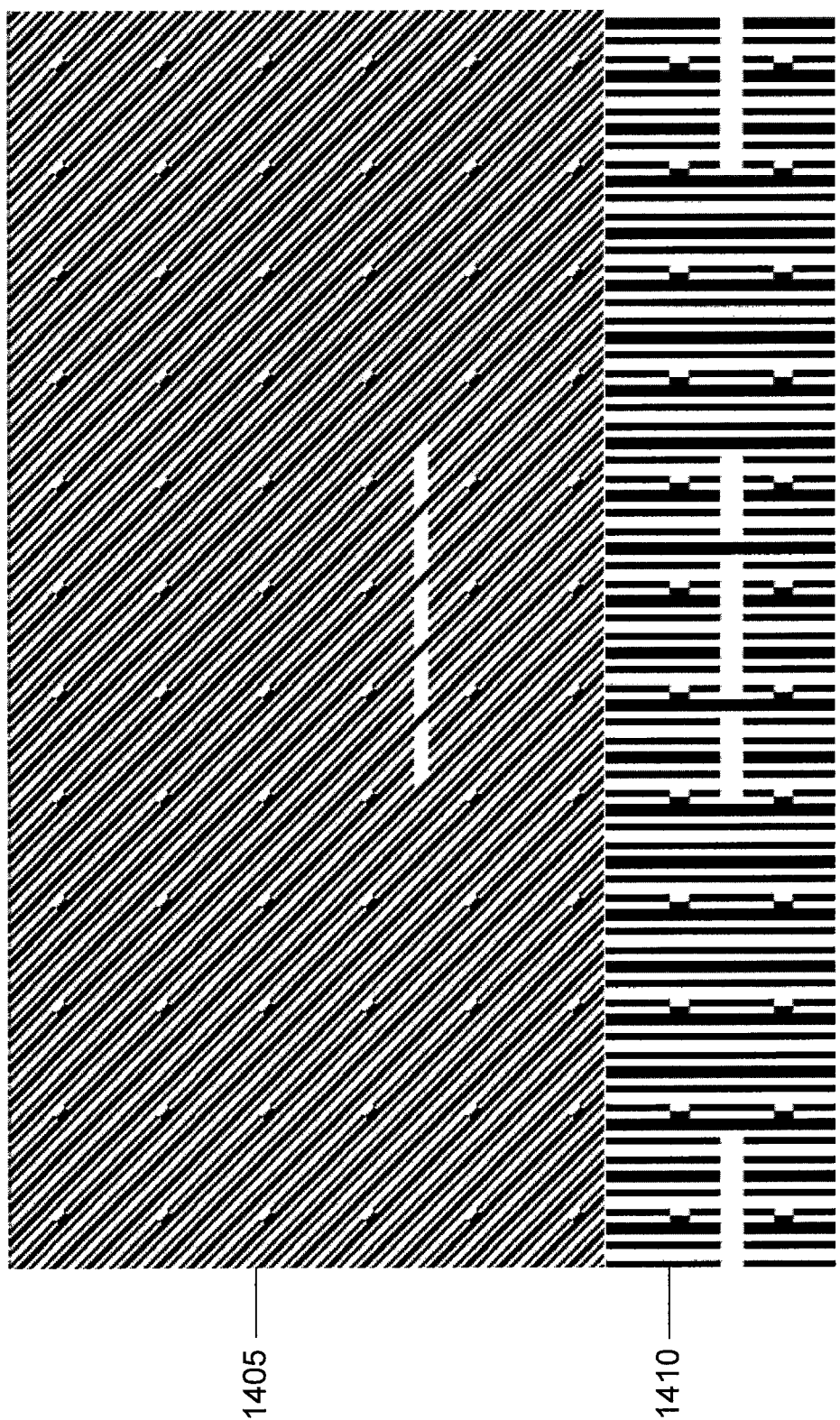
FIG. 14 is a diagram illustrating showing a first light pattern and a second light pattern that can be projected such that it is incident on an object and a surface on which the object is positioned, respectively.

FIG. 14 is a diagram illustrating showing a first light pattern and a second light pattern that can be projected such that it is incident on an object and a surface on which the object is positioned, respectively. In some implementations, predetermined light patterns, for example, a first light pattern 1405 and a second light pattern 1410, are projected onto at least a portion of the object and onto at least a portion of a surface on which the object is positioned, respectively. As described previously, each projected light pattern includes multiple light elements. For example, a projector, such as the flash lens 1003, is used to project a flash of light through a glass slide having two patterns of markings selected and etched in the glass slide to produce the two light patterns.

Although FIG. 14 illustrates two light patterns that are incident on an object and a surface, it will be appreciated that multiple light patterns can be generated from a single light source, for example, flash lens 1003. In some implementations, the light pattern 1410 has vertical stripes. Optionally, for example, the light pattern 1410 is normal to a surface on which the light pattern is projected. Further, the light pattern 1410 optionally includes multiple vertical stripes, each stripe being thicker than a stripe in the light pattern 1405. The vertical orientation and the thickness of the stripes in the light pattern 1410 simplify the identification of the margins of the stripes despite the amount of random debris that can be encountered on a floor of the swine's habitat.

Figure 15:
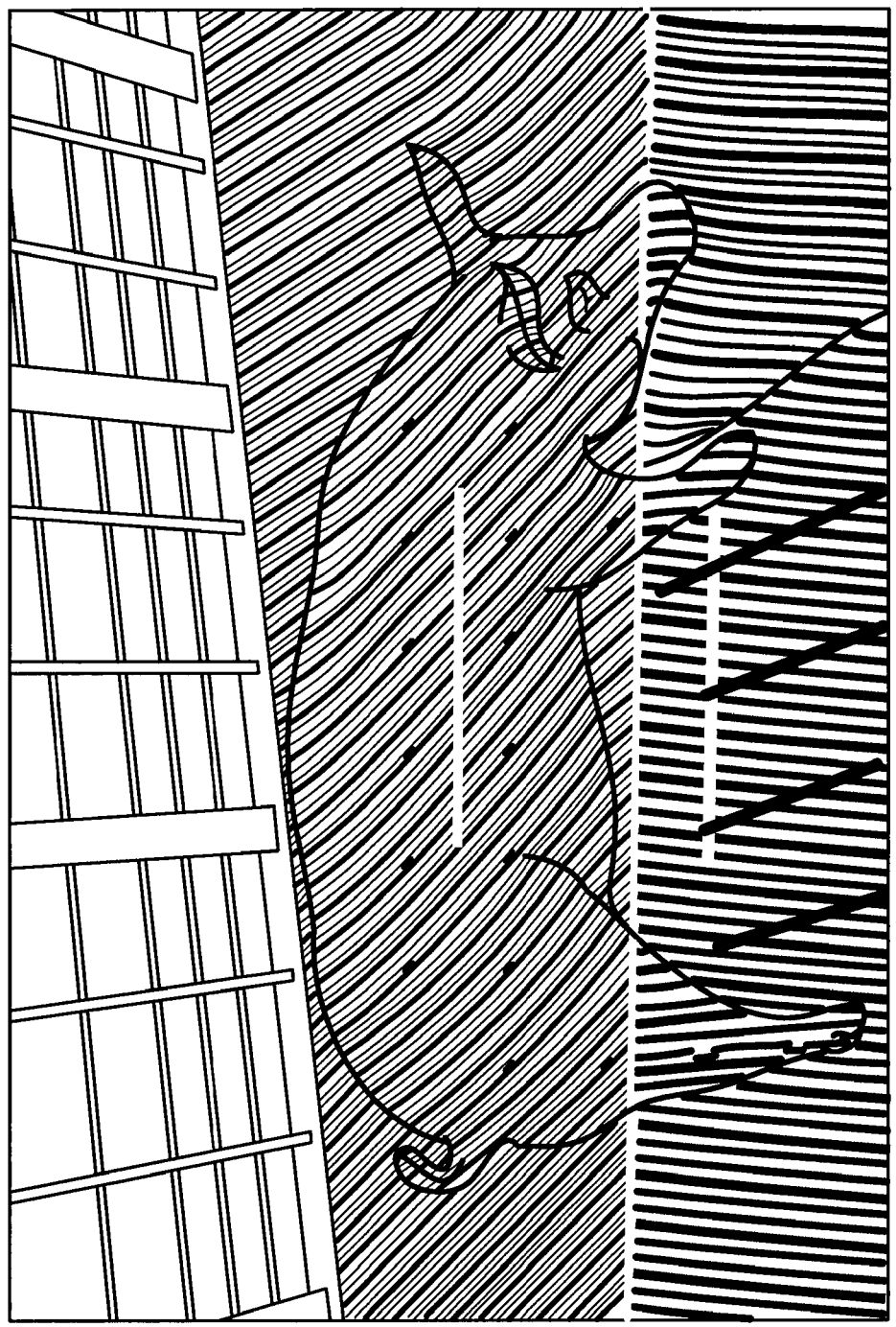
FIG. 15 is a raw image of a pig marked with two light patterns simultaneously.

The light pattern 1405 includes multiple diagonal stripes. The diagonal stripes increase the coverage of areas of the swine because of the barrel shape of the swine. The two light patterns can be projected onto the object simultaneously. For example, of an area occupied by both light patterns, the first light pattern 1405 occupies the top 80% to image the object, for example, the swine, and the second light pattern 1410 occupies the bottom 20%, for example, the floor on which the swine is resting (FIG. 15). Capturing the floor enables aligning the swine. In other words, because both the swine and a user of the projector are unrestrained, the second light pattern 1410 improves imaging the floor and determining "up" relative to the swine.

Interactions between the light patterns, 1405 and 1410, on the object and the surface, produce light patterns that can be detected. For example, the camera 1002 detects multiple light elements that collectively represent the light patterns produced by the interaction. A data processing apparatus, described with reference to FIG. 16, is configured to determine the three dimensional location of multiple light elements included in the detected light patterns, and to determine a three dimensional representation of at least a portion of the object and a three dimensional representation of at least a portion of the surface from the determined three dimensional locations of the multiple light elements from the detected light patterns. The data processing apparatus is also configured to determine a position of the object relative to the surface based on the determined three dimensional representations of at least a portion of the object and at least a portion of the surface.

In implementations in which the detected light pattern is detected from a single location, the single detected light pattern processed to provide the three dimensional representation of at least a portion of the object is optionally based on a single projection of a predetermined light pattern onto at least a portion of the object. Each single detection location can be offset from the location from which the pattern is projected. The single location from which one or more of the light patterns is detected differs between one or more detected light pattern.

In implementations in which the physical parameter is estimated based on comparison with a standard, the three dimensional representation of at least a portion of the object is optionally registered with the representation of the standard object to determine the orientation of the three dimensional representation relative to the standard object representation. The orientation of at least a portion of the three dimensional representation can be compared to the orientation of the standard object representation to estimate differences in distances between portions of the three dimensional representation and portions of the standard object. In scenarios in which weight of a mammal or poultry is estimated, the standard object representation is based on the same species of the mammal or poultry or a mammal or poultry of the same genetic type. Additionally, the standard object representation can be based on a mammal or poultry of a substantially same age as the mammal or poultry being scanned.

In addition to illustrating an example data processing apparatus, FIG. 16 is a block diagram illustrating portions of an example system 100 for estimating a physical parameter of an object. For example, the system 100 can optionally be used to estimate weight of a livestock animal. The example system 100 is only one example of a system for estimating a physical parameter of an object. The system 100 can comprise a capture system 116 that comprises a projection portion comprising a light source 14 and a projection lens 20 and capture portion comprising a detector (for example CCD camera) 28. For example, FIGS. 1-4 and 10-13 illustrate devices with example capture systems. The capture system 116 can communicate with a processing system such as a general purpose computer 101 directly or by way of a input interface 109.

Thus, the example system 100 for estimating a physical parameter of an object includes a general-purpose computing device in the form of a computer 101. The components of the computer 101 can include, but are not limited to, one or more processors or processing devices 103, a system memory 110, and a system bus 111 that couples various system components including the processor 103 to the system memory 110.

The system bus 111 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. The bus 111 can also be implemented over a wired or wireless network connection. Each of the subsystems, including the processor 103, a mass storage device 104, an operating system 105, image processing software 106, three dimensional scan data 107, the system memory 110, an input interface 109, a display adapter 108, a display device 112, a human interface device 102, can be contained within the device housing 12 and/or within one or more remote computers at physically separate locations, connected through buses of this form, in effect implementing a fully distributed system. An example machine human interface 102 is a trigger as shown in FIG. 1.

In some implementations, the three dimensional representations can be captured using, for example, a digital SLR camera, and stored on a memory card. The memory card with the stored images can be removed from the digital SLR camera and then operatively coupled to the data processing apparatus configured to estimate the physical parameters.

The scan data 107 can include or be taken from a plurality of detected light elements from a single detected light pattern from the object. Examples of scan data include, for example, the image acquired with the detector 28; a 3D point cloud that represents the 3D coordinates of the light elements; various representations of a 3D point cloud, such as a surface mesh; and, intermediate data used in the calculation of the 3D coordinates the light elements. The light pattern can be detected from a single detector location. Thus, a light pattern from the object resulting from a single projection of the light pattern using the projector portion of the capture system 116 can be detected by the detector portion of the capture system. When a single projection is used, the light pattern is projected only once, and from a single location, onto at least a portion of the object. The single light pattern interacts with a least a portion of the object and a resulting pattern is detected by the detector portion of the capture system 116. The detected pattern can therefore result from a single projected light pattern projected from a single location of the projector portion of the capture system 116.

The computer 101 can include a variety of computer readable media. Such media can be any available media that is accessible by the computer 101 and includes both volatile and non-volatile media, removable and non-removable media.

The system memory 110 can include computer readable media in the form of volatile memory, such as random access memory (RAM), and/or non-volatile memory, such as read only memory (ROM). The system memory 110 typically contains data such as scan data 107 and/or program modules such as operating system 105, and image processing software 106 that are immediately accessible to and/or are presently operated on by the processing unit 103.

The computer 101 can also include other removable/non-removable, volatile/non-volatile computer storage media. By way of example, a mass storage device 104 can provide non-volatile storage of computer code, computer readable instructions, data structures, program modules, and other data for the computer 101. For example, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 104, including by way of example, an operating system 105, image processing software 106 and scan data 107. A user can enter commands and information into the computer 101 via an input device. Examples of such input devices include, but are not limited to, a keyboard, pointing device (for example, a mouse), a microphone, a joystick, a serial port, a scanner, and the like. These and other input devices can be connected to the processing unit 103 via a human machine interface 102 that is coupled to the system bus 111, but can be connected by other interface and bus structures, such as a parallel port, game port, or a universal serial bus (USB).

A display device 112 can also be connected to the system bus 111 via an interface, such as a display adapter 108. For example, a display device can be a monitor. In addition to the display device 112, other output peripheral devices can include components such as speakers and a printer which can be connected to the computer 101 via an input/output interface.

The computer 101 can operate in a networked environment using logical connections to one or more remote computing devices. By way of example, a remote computing device can be a personal computer, portable computer, a server, a router, a network computer, a peer device or other common network node, and so on.

Logical connections between the computer 101 and a remote computing device can be made via a local area network (LAN) and a general wide area network (WAN). Such networking environments are commonplace in offices, enterprise-wide computer networks, intranets, and the Internet. In a networked environment, image processing software 106 and scan data 107 depicted relative to the computer 101, or portions thereof, can be stored in a remote memory storage device. For purposes of illustration, application programs and other executable program components such as the operating system are illustrated herein as discrete blocks, although it is recognized that such programs and components reside at various times in different storage components of the computing device 101, and are executed by the data processor(s) of the computer.

An implementation of the image processing software 106 can be stored on or transmitted across some form of computer readable media. Computer readable media can be any available media that can be accessed by a computer. By way of example, and not limitation, computer readable media can comprise computer storage media and communications media. Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The scan data 107 can enter the computer 101 via the input interface 109. The input interface can be IEEE-488, IEEE-1394, Universal Serial Bus (USB), or the like. In some examples, the scan data can enter the computer without a input interface. For example, where the device housing 12 comprises the capture system 116 and the computer 101, the scan data 107 can be in communication with the processor 103 without utilizing a input interface 109. The scan data 107 can be stored in the mass storage device 104 and transferred to system memory 110 to be used by image processing software 106.

The imaging processing software 106 can use the scan data 107 to produce a three dimensional representation using triangulation as described above. The imaging processing software can also use the produced three dimensional representation to provide an estimate of the desired physical parameter. Thus, the light detected by the detector 28 and communicated to the computer 101 can be processed to provide a three dimensional representation of at least a portion of the object. The at least a portion of the object can be further processed to estimate a physical parameter (for example weight) of the object. The weight estimate can be displayed on a display device such as 112 or a display device 34 located on the housing 12.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Throughout this disclosure various publications are referenced. The disclosures of these publications in their entireties are hereby incorporated by reference. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for estimating a non-geometric physical parameter of an unrestrained livestock animal, comprising:
   projecting one or more predetermined light patterns onto at least a portion of the unrestrained livestock animal with a single calibrated device comprising a light projector and a light detector, wherein the unrestrained livestock animal is able to move relative to the single calibrated device within a commercial livestock environment;
   detecting one or more light patterns resulting from an interaction of one or more of the projected light patterns and at least a portion of the unrestrained livestock animal using the single device;
   processing, by data processing apparatus, the one or more detected light patterns to provide a three dimensional representation of at least a portion of the unrestrained livestock animal based on light patterns detected only by the single device; and
   using, by the data processing apparatus, the three dimensional representation of at least a portion of the unrestrained livestock animal to estimate the non-geometric physical parameter of the unrestrained livestock animal.

2. The method of claim 1, wherein the three dimensional representation of at least a portion of the unrestrained livestock animal is based on a single projection of the one or more predetermined light patterns.

3. The method of claim 1, wherein the non-geometric physical parameter is weight.

4. The method of claim 1, wherein the device is hand held.

5. The method of claim 4, wherein the data processing apparatus processing the one or more detected light patterns is located remote from the hand held device.

6. The method of claim 1, wherein the estimating comprises comparing the three dimensional representation to a reference representation.

7. The method of claim 6, wherein the reference representation is based on an animal type which is the same as the type of the unrestrained livestock animal.

8. The method of claim 1, wherein the unrestrained livestock animal is a pig and the detecting is performed at an angle selected from the group consisting of, from above the pig, from the side of the pig, from the rear of the pig, from above and from the side of the pig, from above and from the rear of the pig.

9. The method of claim 1, wherein the unrestrained livestock animal is a cow.

10. A non-transitory computer implemented medium having executable instructions stored thereon that when executed by a processor or a computing device performs a method for estimating a physical parameter of an unrestrained livestock animal, comprising:
projecting a plurality of predetermined light patterns onto at least a portion of the unrestrained livestock animal with a single calibrated device comprising a light projector and a light detector, wherein the unrestrained livestock animal is able to move relative to the single calibrated device within a commercial livestock environment;
detecting one or more light patterns resulting from an interaction of the projected light patterns and at least a portion of the unrestrained livestock animal using the single device;
processing the one or more detected light patterns to provide a three dimensional representation of at least a portion of the unrestrained livestock animal based on light patterns detected only by the single device; and
using the three dimensional representation of at least a portion of the animal to estimate the non-geometric physical parameter of the animal.

11. The computer readable medium of claim 10, further comprising instructions for displaying the estimated physical parameter.

12. The computer readable medium of claim 10, wherein the unrestrained livestock animal is a cow.

13. A system for estimating a physical parameter of an unrestrained livestock animal, comprising:
a calibrated device comprising a light projector and a detector configured to project light onto and detect light from the unrestrained livestock animal while the unrestrained livestock animal is able to move relative to the single calibrated device within a commercial livestock environment, the light projector comprising a light source configured to project one or more predetermined light patterns comprising a plurality of light elements onto at least a portion of the unrestrained livestock animal;
the detector configured to detect one or more light patterns comprising a plurality of light elements and resulting from an interaction of one or more projected light pattern and at least a portion of the unrestrained livestock animal; and
a data processing apparatus configured to:
provide a three dimensional representation of at least a portion of the unrestrained livestock animal by determining the three dimensional location of a plurality of light elements from a single detected light pattern detected from a single detector location; and
use the three dimensional representation to estimate the non-geometric physical parameter of the unrestrained livestock animal.

14. The system of claim 13, wherein the detected light pattern processed to provide the three dimensional representation of at least a portion of the unrestrained livestock animal is based on a single projection of a predetermined light pattern onto at least a portion of the unrestrained livestock animal.

15. The system of claim 13, wherein the light projector further comprises an aperture from which one or more predetermined light pattern is projected, wherein the detector comprises an aperture into which one or more light patterns from the unrestrained livestock animal is received and wherein the projector aperture is offset from the detector aperture.

16. The system of claim 13, wherein the unrestrained livestock animal is a cow.

17. An apparatus for estimating weight of an unrestrained livestock animal, comprising:
a single calibrated device configured to project light onto and to detect light from the unrestrained livestock animal while the unrestrained livestock animal is able to move relative to the single calibrated device within a commercial livestock environment, the single calibrated device comprising:
(a) a projector to project one or more predetermined light patterns onto at least a portion of the unrestrained livestock animal;
(b) a detector to detect one or more light patterns resulting from an interaction of one or more of the projected light patterns and at least a portion of the unrestrained livestock animal;
a data processing apparatus to process the one or more detected light patterns to provide a three dimensional representation of at least a portion of the unrestrained livestock animal based on light patterns detected only by the single device and to estimate the weight of the animal based on the three dimensional representation.

18. The apparatus of claim 17, wherein the three dimensional representation of at least a portion of the unrestrained livestock animal is based on a single projection of the one or more predetermined light patterns.

19. The apparatus of claim 17, wherein each single detection location is offset from the location from which the pattern is projected.

20. The apparatus of claim 17, wherein the device is hand held.

21. The apparatus of claim 20, wherein the data processing apparatus is located remote from the hand held device.

22. The apparatus of claim 17, wherein the data processing apparatus estimates the weight of the unrestrained livestock animal by comparing the three dimensional representation to a reference representation.

23. The apparatus of claim 22, wherein the reference representation is based on an animal type which is the same as the type of the unrestrained livestock animal.

* * * * *